: US009541732B2

United States Patent
Sun

(10) Patent No.: US 9,541,732 B2
(45) Date of Patent: Jan. 10, 2017

(54) IMAGING LENS AND IMAGING APPARATUS EQUIPPED WITH THE IMAGING LENS

(71) Applicant: FUJIFILM Corporation, Tokyo (JP)

(72) Inventor: Ping Sun, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/712,930

(22) Filed: May 15, 2015

(65) Prior Publication Data

US 2015/0338615 A1 Nov. 26, 2015

(30) Foreign Application Priority Data

May 23, 2014 (JP) ................................. 2014-107228

(51) Int. Cl.
*G02B 9/62* (2006.01)
*G02B 13/00* (2006.01)
*G02B 13/18* (2006.01)

(52) U.S. Cl.
CPC ............. *G02B 9/62* (2013.01); *G02B 13/0045* (2013.01); *G02B 13/18* (2013.01)

(58) Field of Classification Search
CPC .............................. G02B 9/62; G02B 13/0045

USPC .................................. 359/713, 756, 757, 752
See application file for complete search history.

(56) References Cited

U.S. PATENT DOCUMENTS 9,063,319 B1 * 6/2015 Tang .................. G02B 13/0045
2012/0188654 A1 7/2012 Huang
2012/0262806 A1 10/2012 Huang

FOREIGN PATENT DOCUMENTS

| KR | 10-2011-0024872 | 3/2011 |
| TW | 201331663 | 8/2013 |
| WO | 2014006822 | 1/2014 |

* cited by examiner

*Primary Examiner* — Darryl J Collins
(74) *Attorney, Agent, or Firm* — Jianq Chyun IP Office

(57) ABSTRACT

An imaging lens is constituted by six lenses, including: a first lens having a positive refractive power and a convex surface toward the object side; a second lens having a negative refractive power and a convex surface toward the object side; a third lens having a positive refractive power; a fourth lens having a positive refractive power; a fifth lens having a positive refractive power and a convex surface toward the object side; and a sixth lens having a negative refractive power, provided in this order from the object side. The imaging lens satisfies a predetermined conditional formula.

18 Claims, 16 Drawing Sheets

IMAGING LENS AND IMAGING APPARATUS EQUIPPED WITH THE IMAGING LENS

CROSS REFERENCE TO RELATED APPLICATIONS

The present application claims priority under 35 U.S.C. §119 to Japanese Patent Application No. 2014-107228 filed on May 23, 2014. The above application is hereby expressly incorporated by reference, in its entirety, into the present application.

BACKGROUND OF THE INVENTION

Technical Field

The present invention is related to a fixed focus imaging lens for forming optical images of subjects onto an imaging element such as a CCD (Charge Coupled Device) and a CMOS (Complementary Metal Oxide Semiconductor). The present invention is also related to an imaging apparatus provided with the imaging lens that performs photography such as a digital still camera, a cellular telephone with a built in camera, a PDA (Personal Digital Assistant), a smart phone, a tablet type terminal, and a portable gaming device.

Background Art

Accompanying the recent spread of personal computers in households, digital still cameras capable of inputting image data such as photographed scenes and portraits into personal computers are rapidly becoming available. In addition, many cellular telephones, smart phones, and tablet type terminals are being equipped with camera modules for inputting images. Imaging elements such as CCD's and CMOS's are employed in these devices having photography functions. Recently, miniaturization of these imaging elements is advancing, and there is demand for miniaturization of the entirety of the photography devices as well as imaging lenses to be mounted thereon. At the same time, the number of pixels in imaging elements is increasing, and there is demand for high resolution and high performance of imaging lenses. Performance corresponding to 5 megapixels or greater, and more preferably 8 megapixels or greater, is desired.

In response to such demands, imaging lenses having a five lens configuration, which is a comparatively large number of lenses, and imaging lenses having a six lens configuration, which has a greater number of lenses in order to improve performance further, have been proposed. For example, International Patent Publication No. WO2014/006822, U.S. Patent Application Publication No. 20120188654, U.S. Patent Application Publication No. 20120262806, Taiwanese Patent Publication No. 201331663, and Korean Patent Publication No. 10-2011-0024872 propose imaging lenses having six lens configurations.

DISCLOSURE OF THE INVENTION

Demand for further shortening of the total lengths of lenses is increasing for imaging lenses which are employed in devices such as smart phones and tablet terminals, which are becoming progressively thinner. It is preferable for the total lengths of the imaging lenses disclosed in International Patent Publication No. WO2014/006822, U.S. Patent Application Publication No. 20120188654, U.S. Patent Application Publication No. 20120262806, Taiwanese Patent Publication No. 201331663, and Korean Patent Publication No. 10-2011-0024872 above to be further shortened.

The present invention has been developed in view of the foregoing points.

A first imaging lens of the present invention consists of six lenses, including:
a first lens having a positive refractive power and a convex surface toward the object side;
a second lens having a negative refractive power and a convex surface toward the object side;
a third lens having a positive refractive power;
a fourth lens having a positive refractive power;
a fifth lens having a positive refractive power and a convex surface toward the object side; and
a sixth lens having a negative refractive power, provided in this order from the object side;
the imaging lens satisfying the following conditional formula:

$$f23/f < -2.5 \tag{1}$$

wherein f23 is the combined focal length of the second lens and the third lens, and f is the focal length of the entire system.

A second imaging lens of the present invention consists of six lenses, including:
a first lens having a positive refractive power and a convex surface toward the object side;
a second lens having a negative refractive power and a convex surface toward the object side;
a third lens having a positive refractive power and a convex surface toward the image side;
a fourth lens having a positive refractive power;
a fifth lens having a positive refractive power and a convex surface toward the object side; and
a sixth lens having a negative refractive power, provided in this order from the object side.

Note that in the first and second imaging lenses of the present invention, the expression "consists of six lenses" means that the imaging lens of the present invention may also include lenses that practically have no power, optical elements other than lenses such as a stop and a cover glass, and mechanical components such as lens flanges, a lens barrel, a camera shake correcting mechanism, etc., in addition to the six lenses. In addition, the shapes of the surfaces of the lenses and the signs of the refractive indices thereof are considered in the paraxial region in the case that the lenses include aspherical surfaces.

The optical performance of the first and second imaging lenses of the present invention can be further improved by adopting the following favorable configurations.

In the first imaging lens of the present invention, it is preferable for the third lens to have a convex surface toward the image side.

It is preferable for the first and second imaging lenses of the present invention to further comprise an aperture stop positioned at the object side of the surface of the second lens toward the object side.

The first and second imaging lens of the present invention may satisfy one or arbitrary combinations of Conditional Formulae (2) through (13) and Conditional Formulae (1-1) through (3-1) below.

$$f23/f < -2.8 \tag{1-1}$$

$$2 < f34/f < 4.5 \tag{2}$$

$$2.2 < f34/f < 4.2 \tag{2-1}$$

$$-7.8 < f56/f < -1.2 \tag{3}$$

$$-6.8<f56/f<-2.2 \qquad (3\text{-}1)$$

$$-1.75<f2/f<-1.3 \qquad (4)$$

$$2<f3/f<9 \qquad (5)$$

$$15<f4/f<120 \qquad (6)$$

$$-5<f3/f2<-1 \qquad (7)$$

$$1.15<f1/f5<3 \qquad (8)$$

$$1<CT3/CT4<6 \qquad (9)$$

$$1.7<CT5/CT6<5 \qquad (10)$$

$$2.3<(L3r-L3f)/(L3r+L3f)<8.5 \qquad (11)$$

$$-20<(L6r-L6f)/(L6r+L6f)<-3.5 \qquad (12)$$

$$0.5<f\cdot\tan\omega/L6r<20 \qquad (13)$$

wherein f is the focal length of the entire system, f23 is the combined focal length of the second lens and the third lens, f34 is the combined focal length of the third lens and the fourth lens, f56 is the combined focal length of the fifth lens and the sixth lens, f1 is the focal length of the first lens, f2 is the focal length of the second lens, f3 is the focal length of the third lens, f4 is the focal length of the fourth lens, f5 is the focal length of the fifth lens, CT3 is the thickness of the third lens along the optical axis, CT4 is the thickness of the fourth lens along the optical axis, CT5 is the thickness of the fifth lens along the optical axis, CT6 is the thickness of the sixth lens along the optical axis, L3r is the paraxial radius of curvature of the surface of the third lens toward the image side, L3f is the paraxial radius of curvature of the surface of the third lens toward the object side, L6r is the paraxial radius of curvature of the surface of the sixth lens toward the image side, L6f is the paraxial radius of curvature of the surface of the sixth lens toward the object side, and co is half the maximum angle of view when focused on an object at infinity.

An imaging apparatus of the present invention is equipped with the imaging lens of the present invention.

According to the first and second imaging lenses of the present invention, the configuration of each lens element is optimized within a lens configuration having six lenses as a whole. Therefore, a lens system that can achieve a short total length, which is compatible with an increased number of pixels of imaging elements, and has high imaging performance from a central angle of view to peripheral angles of view can be realized.

The imaging apparatus of the present invention outputs image signals corresponding to optical images formed by the first or second imaging lens of the present invention. Therefore, the imaging apparatus of the present invention is capable of obtaining high resolution photographed images.

BEST MODE FOR CARRYING OUT THE INVENTION

Hereinafter, embodiments of the present invention will be described in detail with reference to the attached drawings.

Figure 1:
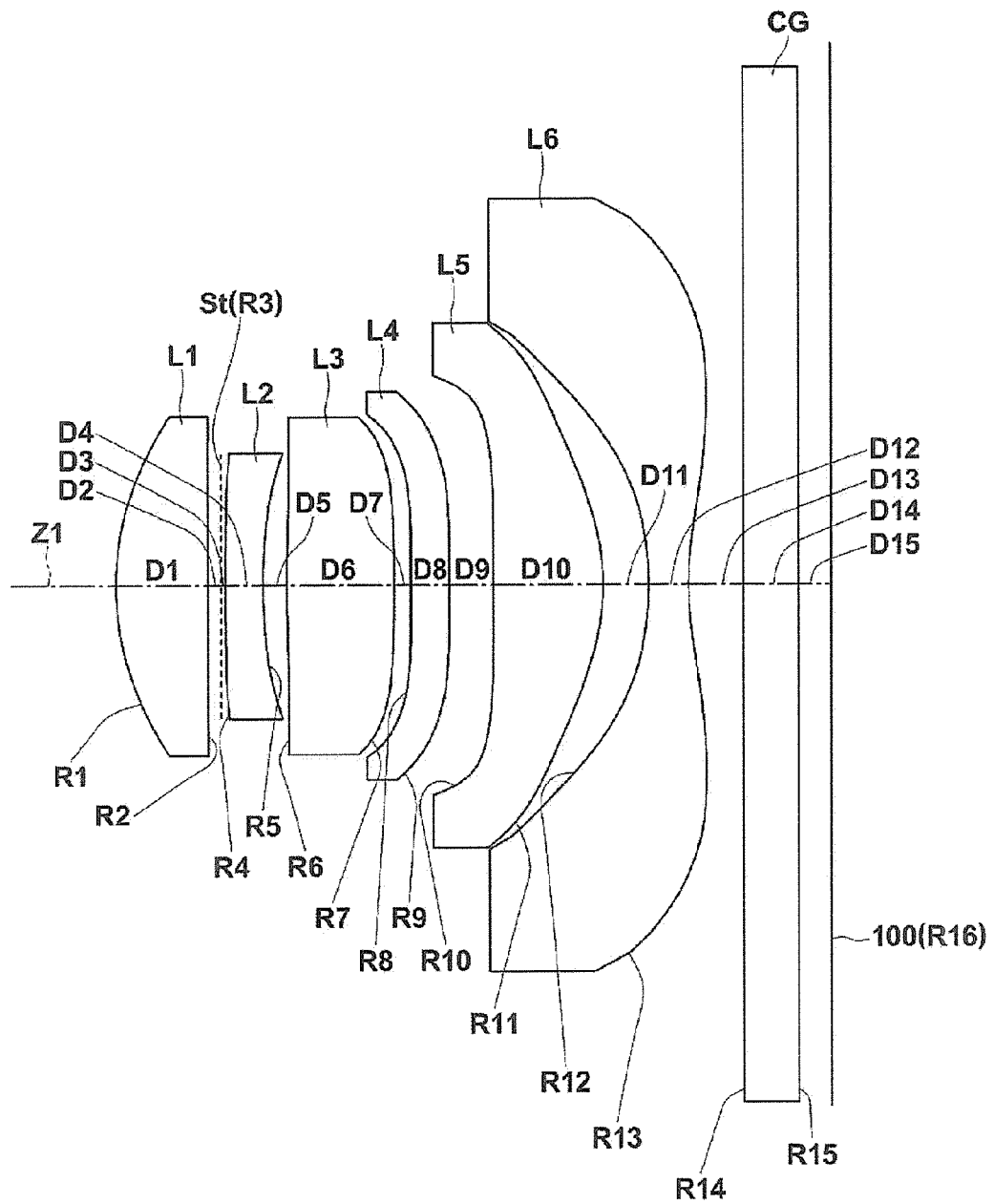
FIG. 1 is a sectional diagram that illustrates a first example of the configuration of an imaging lens according to an embodiment of the present invention, and corresponds to a lens of Example 1.
Figure 2:
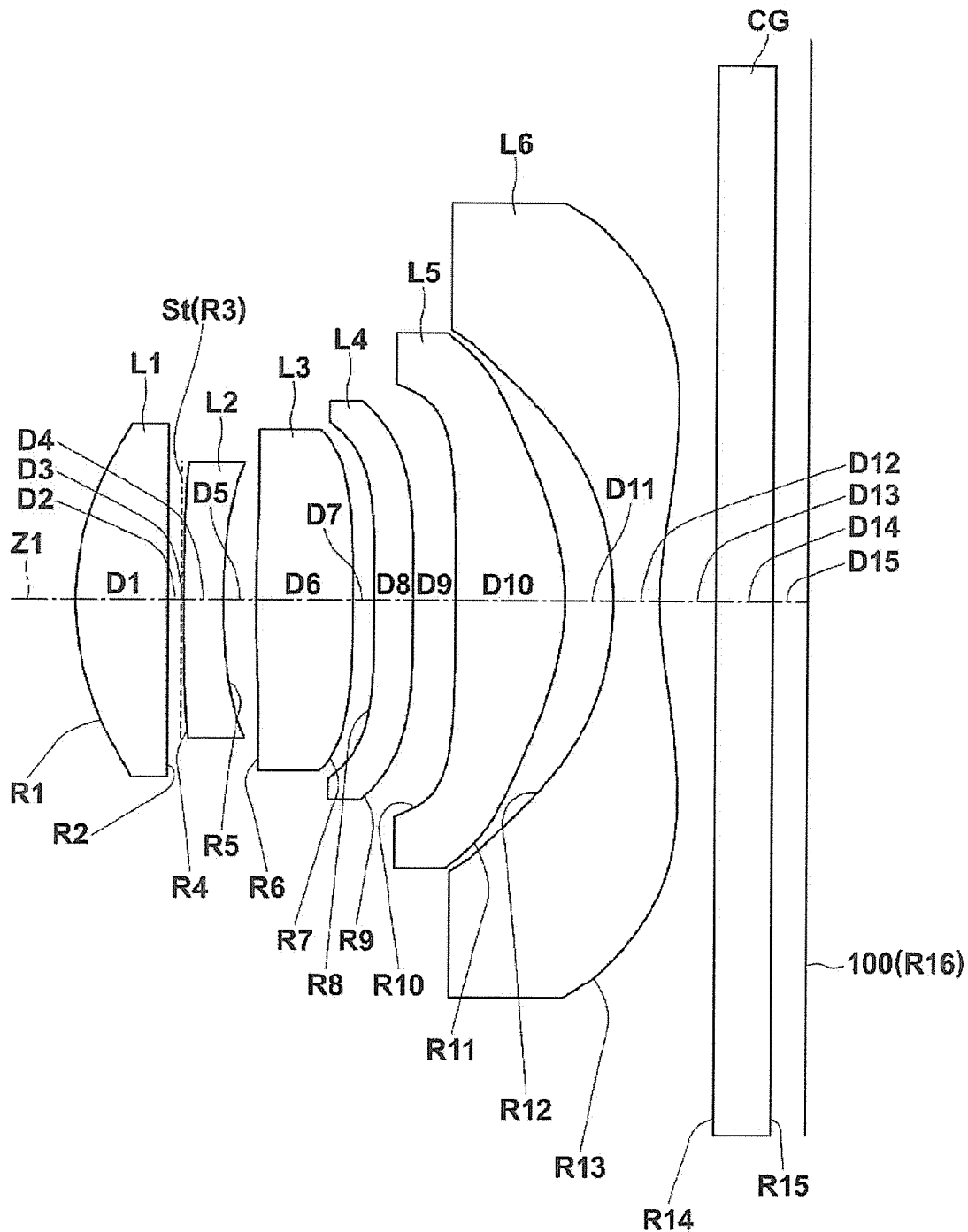
FIG. 2 is a sectional diagram that illustrates a second example of the configuration of an imaging lens according to an embodiment of the present invention, and corresponds to a lens of Example 2.
Figure 3:
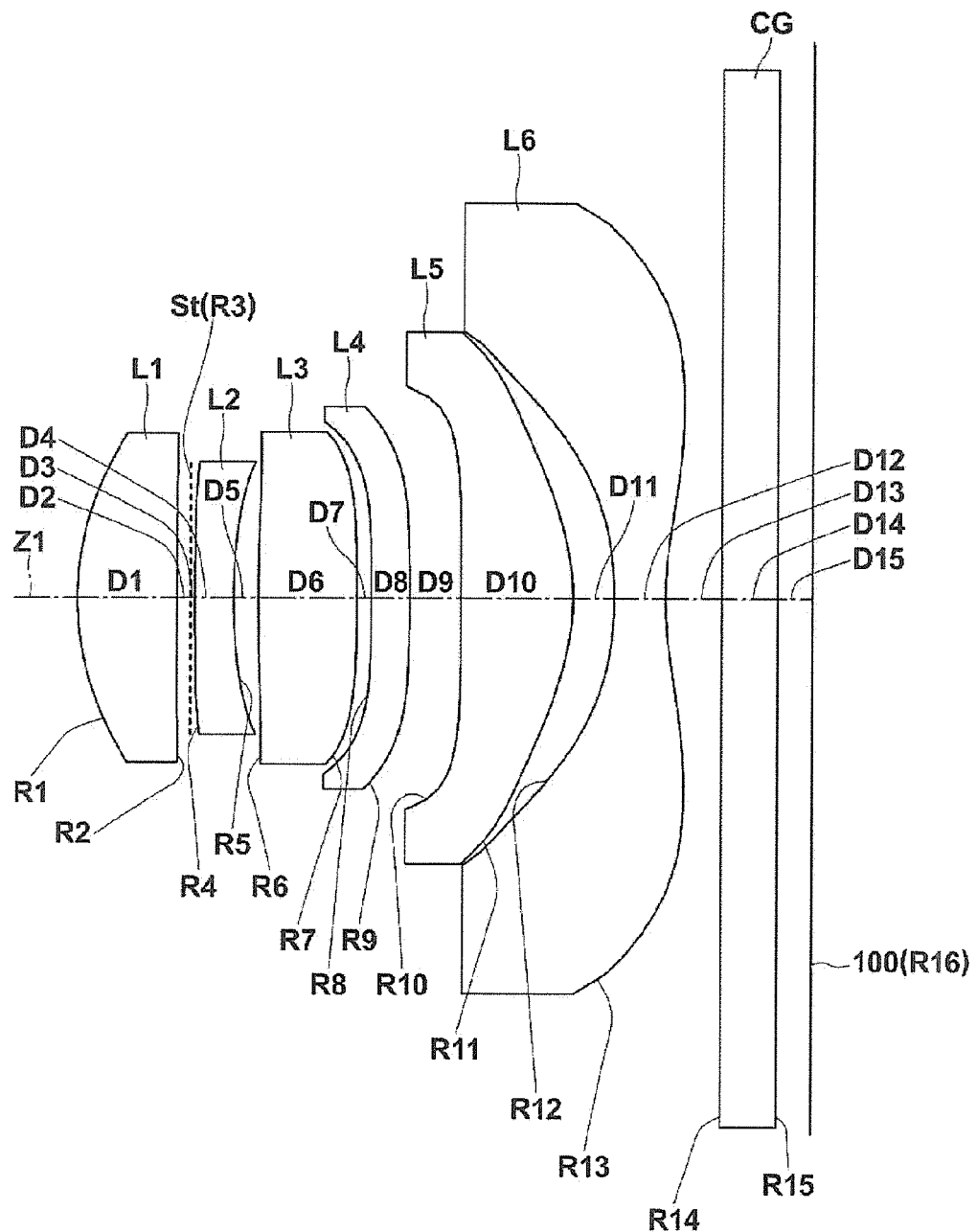
FIG. 3 is a sectional diagram that illustrates a third example of the configuration of an imaging lens according to an embodiment of the present invention, and corresponds to a lens of Example 3.
Figure 4:
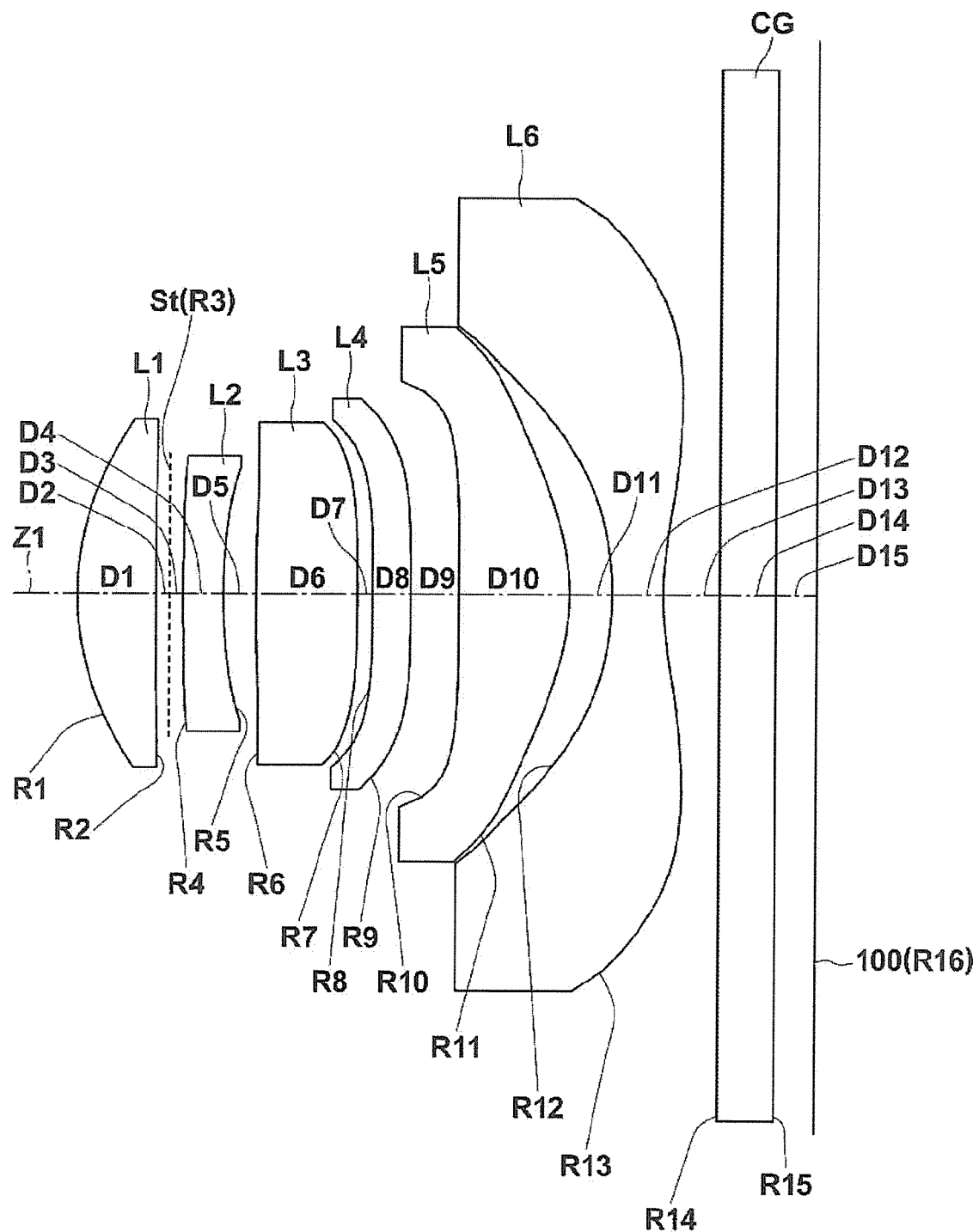
FIG. 4 is a sectional diagram that illustrates a fourth example of the configuration of an imaging lens according to an embodiment of the present invention, and corresponds to a lens of Example 4.
Figure 5:
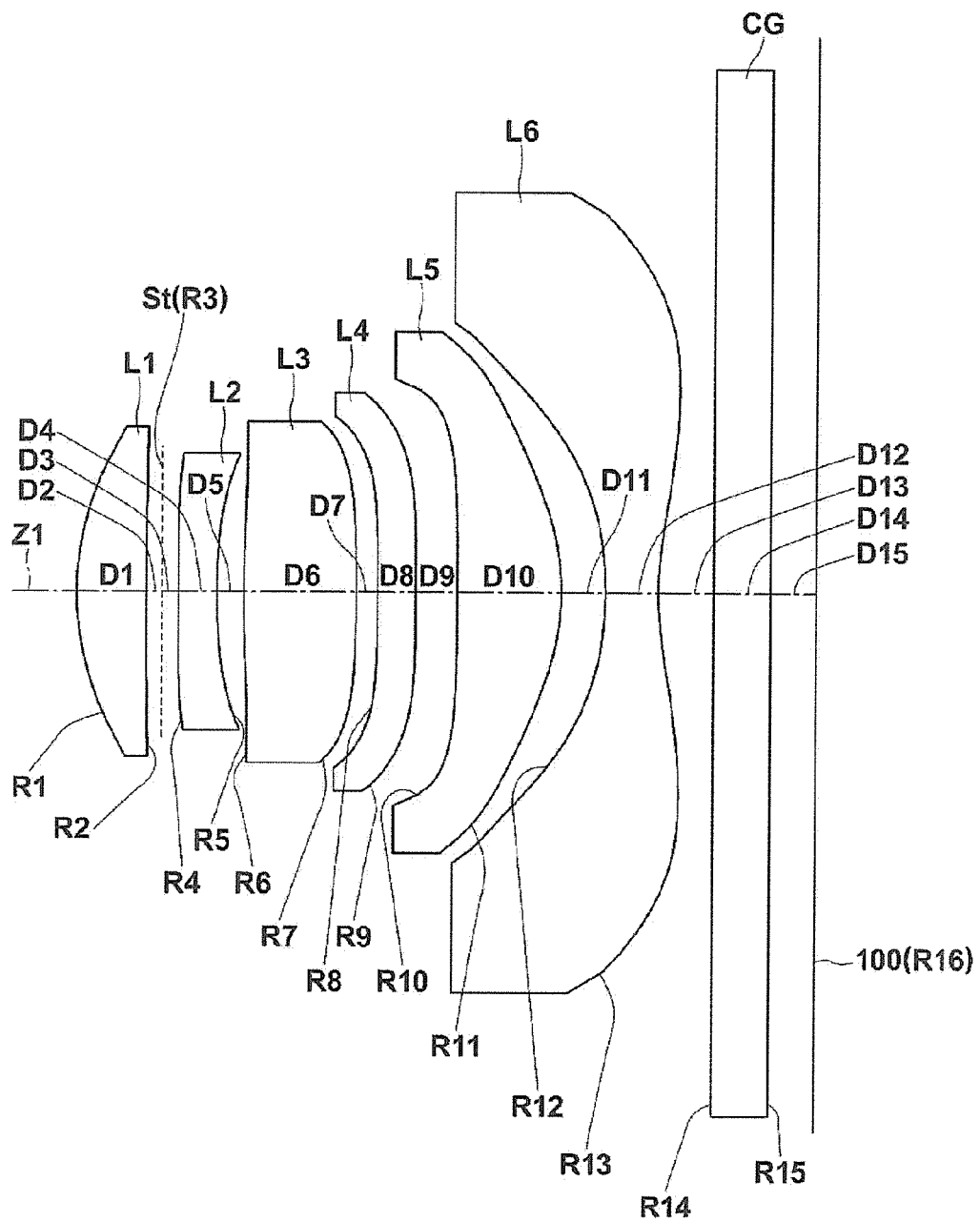
FIG. 5 is a sectional diagram that illustrates a fifth example of the configuration of an imaging lens according to an embodiment of the present invention, and corresponds to a lens of Example 5.
Figure 6:
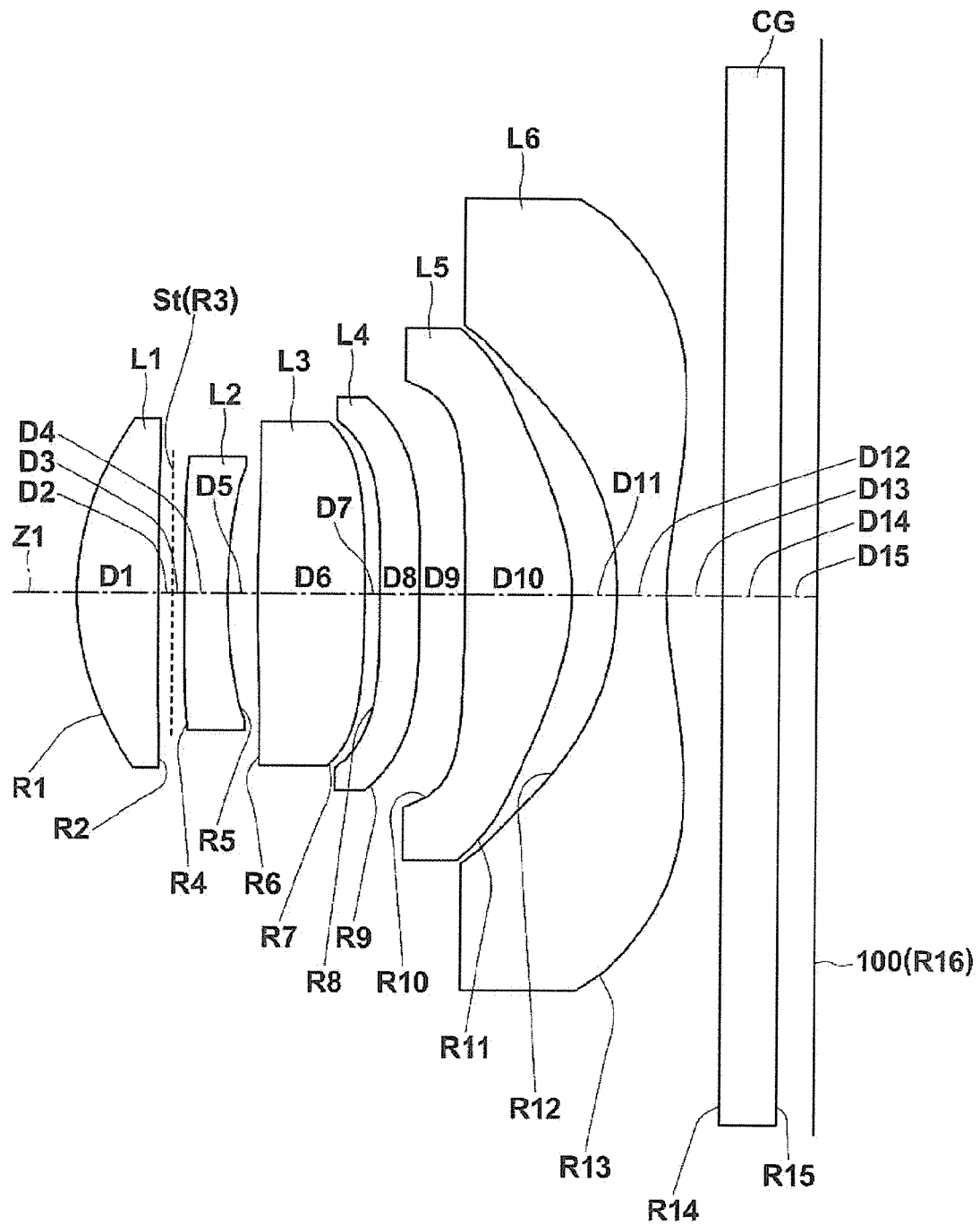
FIG. 6 is a sectional diagram that illustrates a sixth example of the configuration of an imaging lens according to an embodiment of the present invention, and corresponds to a lens of Example 6.
Figure 7:
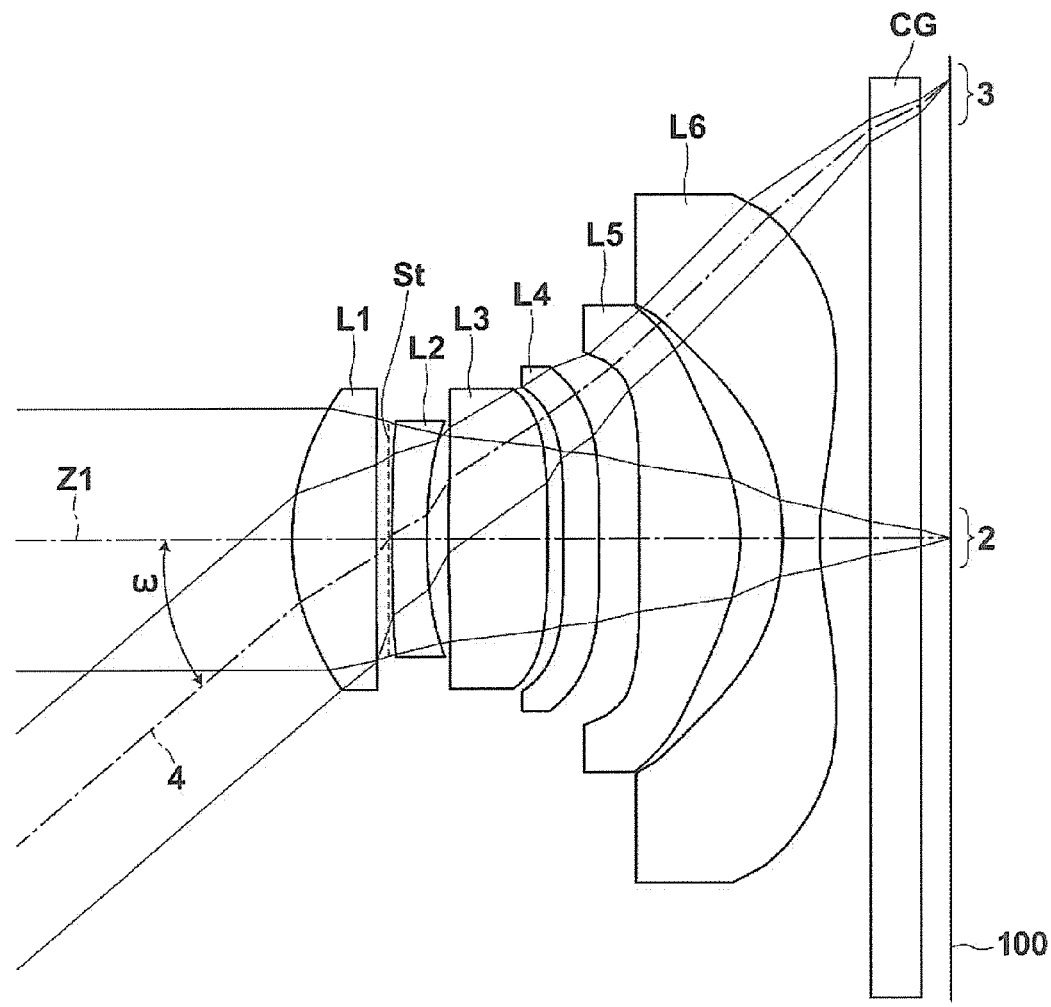
FIG. 7 is a diagram that illustrates the paths of light rays that pass through the imaging lens of FIG. 1.

FIG. 1 illustrates a first example of the configuration of an imaging lens according to an embodiment of the present invention. This example corresponds to the lens configuration of Numerical Example 1 (Table 1 and Table 2), to be described later. Similarly, FIG. 2 through FIG. 6 are sectional diagrams that illustrate second through sixth examples of lens configurations that correspond to Numerical Examples 2 through 6 (Table 3 through Table 12). In FIGS. 1 through 6, the symbol Ri represents the radii of curvature of ith surfaces, i being lens surface numbers that sequentially increase from the object side to the image side (imaging side), with the surface of a lens element most toward the object side designated as first. The symbol Di represents the distances between an ith surface and an i+1st surface along an optical axis Z1. Note that the basic configurations of the examples are the same, and therefore a description will be given of the imaging lens of FIG. 1 as a base, and the examples of FIGS. 2 through 6 will also be described as necessary. In addition, FIG. 7 is a diagram that illustrates the paths of light rays that pass through the imaging lens L of FIG. 1. FIG. 7 illustrates the paths of axial light beams 2 and maximum angle of view light beams 3 from an object at a distance of infinity, and a half value co of a maximum angle of view. Note that a principal light ray 4 of the maximum angle of view light beams 3 is indicated by a single dot chained line.

The imaging lens L of the embodiment of the present invention is favorably employed in various imaging devices that employ imaging elements such as a CCD and a CMOS. The imaging lens L of the embodiment of the present invention is particularly favorable for use in comparatively miniature portable terminal devices, such as a digital still camera, a cellular telephone with a built in camera, a smart phone, a tablet type terminal, and a PDA. The imaging lens L is equipped with a first lens L1, a second lens L2, a third lens L3, a fourth lens L4, a fifth lens L5, and a sixth lens L6, provided in this order from the object side.

Figure 14:
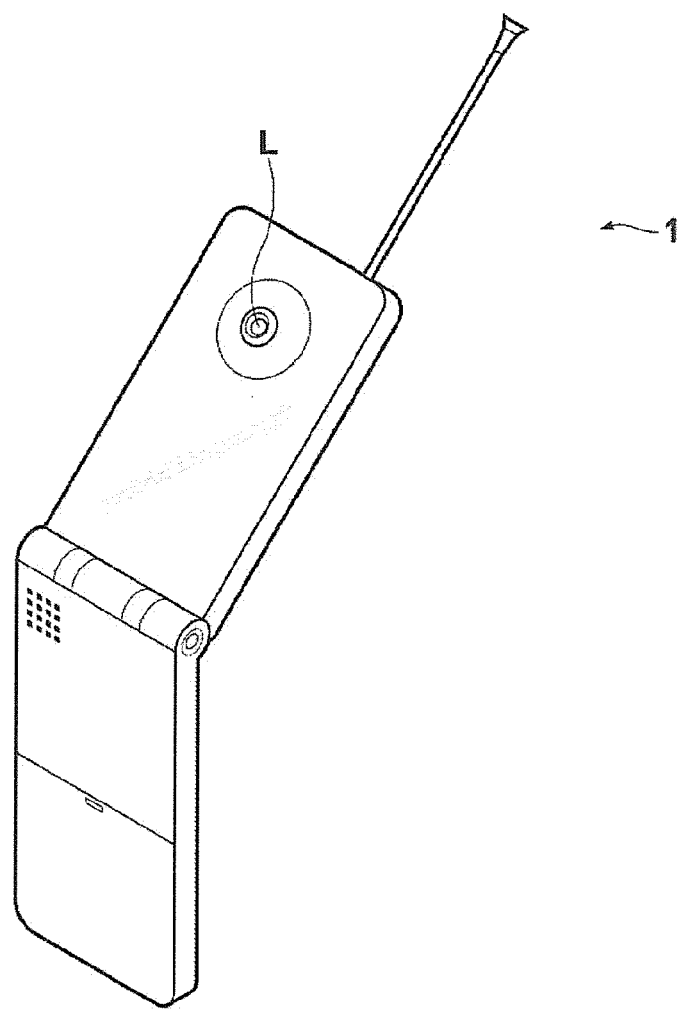
FIG. 14 is a diagram that illustrates a cellular telephone as an imaging apparatus equipped with the imaging lens of the present invention.

FIG. 14 schematically illustrates a cellular telephone as an imaging apparatus 1 according to an embodiment of the present invention. The imaging apparatus 1 of the embodiment of the present invention is equipped with the imaging lens L according to the embodiment of the present invention and an imaging element 100 (refer to FIG. 1) such as a CCD that outputs image signals corresponding to optical images formed by the imaging lens L. The imaging element 100 is provided at an image formation plane (imaging surface R16 in FIGS. 1 through 6) of the imaging lens L.

Figure 15:
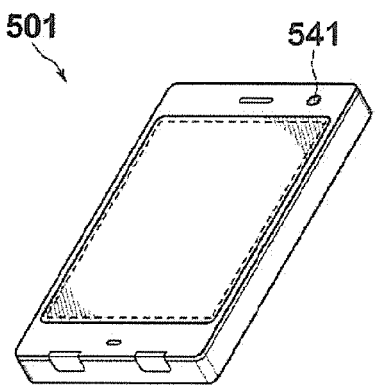
FIG. 15 is a diagram that illustrates a smart phone as an imaging apparatus equipped with the imaging lens of the present invention.

FIG. 15 schematically illustrates a smart phone as an imaging apparatus 501 according to an embodiment of the present invention. The imaging apparatus 501 of the embodiment of the present invention is equipped with a camera section 541 having the imaging lens L according to the embodiment of the present invention and an imaging element 100 (refer to FIG. 1) such as a CCD that outputs image signals corresponding to optical images formed by the imaging lens L. The imaging element 100 is provided at an image formation plane (imaging surface) of the imaging lens L.

Various optical members CG may be provided between the sixth lens L6 and the imaging element 100, depending on the configuration of the camera to which the lens is applied. A planar optical member such as a cover glass for protecting the imaging surface and an infrared cutoff filter may be provided, for example. In this case, a planar cover glass having a coating having a filtering effect such as an infrared cutoff filter coating or an ND filter coating, or a material that exhibits similar effects, may be utilized as the optical member CG.

Alternatively, the optical member CG may be omitted, and a coating may be administered on the sixth lens L6 to obtain the same effect as that of the optical member CG. In this case, the number of parts can be reduced, and the total length can be shortened.

It is preferable for the imaging lens L to be equipped with an aperture stop St positioned at the object side of the surface of the second lens L2 toward the object side. In the case that the aperture stop St is positioned at the object side of the surface of the second lens L2 toward the object side in this manner, increases in the incident angles of light rays that pass through the optical system and enter the image formation plane (imaging element) can be suppressed, particularly at peripheral portions of an imaging region. Note that the expression "positioned at the object side of the surface of the second lens L2 toward the object side" means that the position of the aperture stop in the direction of the optical axis is at the same position as the intersection of marginal axial rays of light and the surface of the second lens L2 toward the object side, or more toward the object side than this position. It is preferable for the apertures stop St to be positioned at the object side of the surface of the first lens L1 toward the object side, in order to cause this advantageous effect to become more prominent. Note that the expression "positioned at the object side of the surface of the first lens L1 toward the object side" means that the position of the aperture stop in the direction of the optical axis is at the same position as the intersection of marginal axial rays of light and the surface of the first lens L1 toward the object side, or more toward the object side than this position.

Alternatively, the apertures stop St may be positioned between the first lens L1 and the second lens L2. In this case, the total length can be shortened, while aberrations can be corrected in a well balanced manner by the lens positioned at the object side of the aperture stop St and the lenses positioned at the image side of the aperture stop St. In the embodiments, the lenses of the first through sixth Examples (FIGS. 1 through 6) are examples in which the aperture stop St is positioned between the first lens L1 and the second lens L2. Note that the aperture stops St illustrated in the figures do not necessarily represent the sizes or shapes thereof, but indicate the positions thereof on the optical axis Z1.

In the imaging lens L, the first lens L1 has a positive refractive power in the vicinity of the optical axis. This configuration is advantageous from the viewpoint of shortening the total length of the lens. In addition, the first lens L1 has a convex surface toward the object side in the vicinity of the optical axis. In this case, the positive refractive power of the first lens L1, which performs a substantial portion of the image forming function, can be sufficiently increased. As a result, shortening of the total length of the lens can be more favorably realized. In addition, the first lens L1 may be of a biconvex shape in the vicinity of the optical axis. In this case, the positive refractive power of the first lens L1 can be favorably secured, while suppressing the generation of spherical aberration. Alternatively, the first lens L1 may be of a meniscus shape having a convex surface toward the object side in the vicinity of the optical axis. In this case, a shortening of the total length can be favorably realized.

In addition, the second lens L2 has a negative refractive power in the vicinity of the optical axis. Thereby, spherical aberration and chromatic aberration can be favorably corrected. In addition, the second lens L2 has a convex surface toward the object side in the vicinity of the optical axis. For this reason, spherical aberration and astigmatism can be more favorably corrected. This configuration is also advantageous from the viewpoint of shortening the total length of the lens. It is preferable for the second lens L2 to be of a meniscus shape having a convex surface toward the object side in the vicinity of the optical axis, in order to cause these advantageous effects to become more prominent.

The third lens L3 and the fourth lens L4 both have positive refractive powers in the vicinity of the optical axis. Because the first lens L1, the third lens L3, and the fourth lens L4 have positive refractive powers, the imaging performance of the imaging lens L can be maintained while spherical aberration can be favorably corrected, by the principal image forming function of the imaging lens L being distributed among the first lens L1, the third lens L3, and the fourth lens L4.

It is preferable for the third lens L3 to have convex surface toward the image side in the vicinity of the optical axis. In this case, suppressing the generation of astigmatism while securing the positive refractive power of the third lens L3 is facilitated, and this configuration is also advantageous from the viewpoint of shortening the total length of the lens. Further, it is preferable for the third lens L3 to be of a biconvex shape in the vicinity of the optical axis. In this case, the refractive power of the third lens L3 can be secured by both the surface of the third lens L3 toward the object side and the surface of the third lens L3 toward the image side, while the generation of various aberrations can be favorably suppressed.

In addition, the fourth lens L4 may be of a biconvex shape in the vicinity of the optical axis. In this case, the refractive power of the fourth lens L4 can be secured, while the generation of spherical aberration can be favorably suppressed. Alternatively, the fourth lens L4 may be of a meniscus shape having a convex surface toward the object side in the vicinity of the optical axis. This configuration is advantageous from the viewpoint of shortening the total length of the lens. As a further alternative, the fourth lens L4 may be of a meniscus shape having a convex surface toward the image side in the vicinity of the optical axis. In this case, the generation of astigmatism can be suppressed.

The fifth lens L5 has a positive refractive power in the vicinity of the optical axis. Thereby, increases in the incident angles of light rays that pass through the optical system at and enter the image formation plane (imaging element) can be favorably suppressed, particularly at intermediate angles of view. In addition, the fifth lens L5 has a convex surface toward the object side in the vicinity of the optical axis. This configuration is advantageous from the viewpoint of shortening the total length. In addition, it is preferable for the fifth lens L5 to be of a biconvex shape in the vicinity of the optical axis. In this case, the refractive power of the fifth lens L5 can be secured by both the surface of the fifth lens L5 toward the object side and the surface of the fifth lens L5 toward the image side, while the generation of various aberrations can be favorably suppressed.

The sixth lens L6 has a negative refractive power in the vicinity of the optical axis. For this reason, if the first lens L1 through the fifth lens L5 are considered to be a positive lens group, and the sixth lens L6 is considered to be a negative lens group in the imaging lens L, the imaging lens L can have a telephoto type configuration as a whole. Thereby, the rearward principal point of the imaging lens L can be moved toward the object side, and shortening of the total length of the lens can be favorably realized. In addition, field curvature can be favorably corrected by the sixth lens L6 having a negative refractive power in the vicinity of the optical axis.

In addition, it is preferable for the sixth lens L6 to have a concave surface toward the image side in the vicinity of the optical axis. In this case, a shortening of the total length of the lens can be more favorably realized, while field curvature can be favorably corrected. Further, it is preferable for the sixth lens L6 to be of a biconcave shape in the vicinity of the optical axis. In this case, the refractive power of the sixth lens L6 can be secured by both the surface of the sixth lens L6 toward the object side and the surface of the sixth lens L6 toward the image side, while the generation of various aberrations can be favorably suppressed. In addition, the burden of the surface of the sixth lens L6 toward the image side bearing negative refractive power can be lessened in the case that the sixth lens L6 is of a biconcave shape in the vicinity of the optical axis compared to a case in which the sixth lens L6 has a convex surface toward the object side in the vicinity of the optical axis. Therefore, increases in the incident angles of light rays that pass through the optical system at and enter the image formation plane (imaging element) can be favorably suppressed, particularly at intermediate angles of view.

In addition, it is preferable for the surface of the sixth lens L6 toward the image side to be of an aspherical shape having at least one inflection point at a position in an inwardly radial direction from the intersection of a principal light ray at a maximum angle of view and the surface of the sixth lens L6 toward the image side to the optical axis. By adopting this configuration, increases in the incident angles of light rays that pass through the optical system at and enter the image formation plane (imaging element) can be suppressed, particularly at the peripheral portions of the imaging region. In addition, distortion can be favorably corrected, by the surface of the sixth lens L6 toward the image side being of an aspherical shape having at least one inflection point at a position in an inwardly radial direction from the intersection of a principal light ray at a maximum angle of view and the surface of the sixth lens L6 toward the image side to the optical axis. Note that the "inflection point" on the surface of the sixth lens L6 toward the image side refers to a point at which the shape of the surface of the sixth lens L6 toward the image side changes from a convex shape to a concave shape (or from a concave shape to a convex shape) with respect to the image side. In addition, in the present specification, the expression "a position in an inwardly radial direction from the intersection of a principal light ray at a maximum angle of view and the surface toward the image side to the optical axis" refers to positions at the intersection of a principal light ray at a maximum angle of view and the surface toward the image side to the optical axis and positions radially inward toward the optical axis from these positions. In addition, the inflection point on the surface of the sixth lens L6 toward the image side may be provided positions at the intersection of a principal light ray at a maximum angle of view and the surface of the sixth lens L6 toward the image side to the optical axis and at any desired position radially inward toward the optical axis from these positions.

In addition, in the case that each of the first lens L1 through the sixth lens L6 that constitute the imaging lens L is a single lens, not a cemented lens, the number of lens surfaces will be greater than that for a case in which any of the first lens L1 through the sixth lens L6 is a cemented.

Therefore, the degree of freedom in the design of each lens will increase. As a result, shortening of the total length will be facilitated.

According to the imaging lens L described above, the configurations of each of the first lens L1 through the sixth lens L6 are optimized as lens elements in a lens configuration having a total of six lenses. Therefore, a lens system that achieves a shortened total length, which is compatible with imaging elements that satisfy demand for a greater number of pixels and has high imaging performance from a central angle of view to peripheral angles of view, can be realized.

It is preferable for at least one of the surfaces of each of the first lens L1 through the sixth lens L6 of the imaging lens L to be an aspherical surface, in order to improve performance.

Next, the operation and effects of conditional formulae related to the imaging lens L will be described in greater detail. Note that it is preferable for the imaging lens L to satisfy any one of the following conditional formulae, or arbitrary combinations of the following conditional formulae. It is preferable for the conditional formulae to be satisfied to be selected as appropriate according to the items required of the imaging lens L.

It is preferable for the combined focal length f23 of the second lens L2 and the third lens L3 and the focal length f of the entire system to satisfy Conditional Formula (1) below.

$$f23/f<-2.5 \tag{1}$$

Conditional Formula (1) defines a preferable range of numerical values for the ratio of the combined focal length f23 of the second lens L2 and the third lens L3 with respect to the focal length f of the entire system. By maintaining the combined refractive power of the second lens L2 and the third lens L3 such that the value of f23/f is not greater than or equal to the upper limit defined in Conditional Formula (1), the combined negative refractive power of the second lens L2 and the third lens L3 will not become excessively strong with respect to the refractive power of the entire system. Such a configuration is advantageous from the viewpoint of shortening the total length of the lens while maintaining balance between the refractive powers of the second lens L2 and the third lens L3. It is more preferable for Conditional Formula (1-1) to be satisfied, in order to cause these advantageous effects to become more prominent.

$$f23/f<-2.8 \tag{1-1}$$

In addition, it is preferable for the combined focal length f34 of the third lens L3 and the fourth lens L4 and the focal length f of the entire system to satisfy Conditional Formula (2) below.

$$2<f34/f<-4.5 \tag{2}$$

Conditional Formula (2) defines a preferable range of numerical values for the ratio of the combined focal length f34 of the third lens L3 and the fourth lens L4 with respect to the focal length f of the entire system. By maintaining the combined refractive power of the third lens L3 and the fourth lens L4 such that the value of f34/f is not less than or equal to the lower limit defined in Conditional Formula (2), the combined positive refractive power of the third lens L3 and the fourth lens L4 will not become excessively strong with respect to the refractive power of the entire system. As a result, spherical aberration and astigmatism can be favorably corrected. By securing the combined refractive power of the third lens L3 and the fourth lens L4 such that the value of f34/f is not greater than or equal to the upper limit defined in Conditional Formula (2), the combined positive refractive power of the third lens L3 and the fourth lens L4 will not become excessively weak with respect to the refractive power of the entire system. As a result, the total length of the lens can be favorably shortened. It is more preferable for Conditional Formula (2-1) to be satisfied, in order to cause these advantageous effects to become more prominent.

$$2.2<f34/f<4.2 \tag{2-1}$$

In addition, it is preferable for the combined focal length f56 of the fifth lens L5 and the sixth lens L6 and the focal length f of the entire system to satisfy Conditional Formula (3) below.

$$-7.8<f56/f<-1.2 \tag{3}$$

Conditional Formula (3) defines a preferable range of numerical values for the ratio of the combined focal length f56 of the fifth lens L5 and the sixth lens L6 with respect to the focal length f of the entire system. By securing the combined refractive power of the fifth lens L5 and the sixth lens L6 such that the value of f56/f is not less than or equal to the lower limit defined in Conditional Formula (3), the combined positive refractive power of the fifth lens L5 and the sixth lens L6 will not become excessively weak with respect to the refractive power of the entire system. As a result, the total length of the lens can be favorably shortened. By maintaining the combined refractive power of the fifth lens L5 and the sixth lens L6 such that the value of f56/f is not greater than or equal to the upper limit defined in Conditional Formula (3), the combined positive refractive power of the fifth lens L5 and the sixth lens L6 will not become excessively strong with respect to the refractive power of the entire system. As a result, increases in the incident angle of light rays that pass through the optical system and enter the image formation plane (imaging element) can be suppressed, particularly at intermediate angles of view. It is more preferable for Conditional Formula (3-1) to be satisfied, in order to cause these advantageous effects to become more prominent.

$$-6.8<f56/f<-2.2 \tag{3-1}$$

It is preferable for the focal length f2 of the second lens L2 and the focal length f of the entire system to satisfy Conditional Formula (4) below.

$$-1.75<f2/f<-1.3 \tag{4}$$

Conditional Formula (4) defines a preferable range of numerical values for the ratio of the focal length f2 of the second lens L2 with respect to the focal length f of the entire system. By securing the refractive power of the second lens L2 such that the value of f2/f is not less than or equal to the lower limit defined in Conditional Formula (4), the negative refractive power of the second lens L2 will not become excessively weak with respect to the refractive power of the entire system. As a result, spherical aberration, chromatic aberration, and astigmatism can be favorably corrected. In addition, by maintaining the refractive power of the second lens L2 such that the value of f2/f is not greater than or equal to the upper limit defined in Conditional Formula (4), the negative refractive power of the second lens L2 will not become excessively strong with respect to the refractive power of the entire system. As a result, excessive correction of spherical aberration, chromatic aberration, and astigmatism can be suppressed. It is more preferable for Conditional Formula (4-1) to be satisfied, in order to cause these advantageous effects to become more prominent.

$$-1.7<f2/f<-1.35 \tag{4-1}$$

In addition, it is preferable for the focal length f3 of the third lens L3 and the focal length f of the entire system to satisfy Conditional Formula (5) below:

$$2<f3/f<9 \tag{5}$$

Conditional Formula (5) defines a preferable range of numerical values for the ratio of the focal length f of the entire system with respect to the focal length f3 of the third lens L3. By maintaining the refractive power of the third lens L3 such that the value of f3/f is not less than or equal to the lower limit defined in Conditional Formula (5), the positive refractive power of the third lens L3 will not become excessively strong with respect to the refractive power of the entire system. As a result, a widening of the angle of view can be achieved, and the total length of the lens can be favorably shortened. In addition, by securing the refractive power of the third lens L3 such that the value of f3/f is not greater than or equal to the upper limit defined in Conditional Formula (5), the positive refractive power of the third lens L3 will not become excessively weak with respect to the refractive power of the entire system. As a result, the principal image forming function of the imaging lens L can be favorably distributed among the first lens L1, the third lens L3, and the fourth lens L4, and spherical aberration can be favorably corrected while maintaining a small F number. It is preferable for Conditional Formula (5-1) to be satisfied, in order to cause these advantageous effects to become more prominent.

$$2.3<f3/f<7 \tag{5-1}$$

In addition, it is preferable for the focal length f4 of the fourth lens L4 and the focal length f of the entire system to satisfy Conditional Formula (6) below:

$$15<f4/f<120 \tag{6}$$

Conditional Formula (6) defines a preferable range of numerical values for the ratio of the focal length f of the entire system with respect to the focal length f4 of the fourth lens L4. By maintaining the refractive power of the fourth lens L4 such that the value of f4/f is not less than or equal to the lower limit defined in Conditional Formula (6), the positive refractive power of the fourth lens L4 will not become excessively strong with respect to the refractive power of the entire system. As a result, various aberrations, such as lateral chromatic aberration, can be favorably corrected. In addition, by securing the refractive power of the fourth lens L4 such that the value of f4/f is not greater than or equal to the upper limit defined in Conditional Formula (6), the positive refractive power of the fourth lens L4 will not become excessively weak with respect to the refractive power of the entire system. As a result, the principal image forming function of the imaging lens L can be favorably distributed among the first lens L1, the third lens L3, and the fourth lens L4, and spherical aberration can be favorably corrected. It is preferable for Conditional Formula (6-1) to be satisfied, in order to cause these advantageous effects to become more prominent.

$$17<f4/f<100 \tag{6-1}$$

In addition, it is preferable for the focal length f3 of the third lens L3 and the focal length f2 of the second lens L2 to satisfy Conditional Formula (7) below:

$$-5<f3/f2<-1 \tag{7}$$

Conditional Formula (7) defines a preferable range of numerical values for the ratio of the focal length f3 of the third lens L3 with respect to the focal length f2 of the second lens L2. By securing the refractive power of the third lens L3 with respect to the refractive power of the second lens L2 such that the value of f3/f2 is not less than or equal to the lower limit defined in Conditional Formula (7), the positive refractive power of the third lens L3 will not become excessively weak with respect to the refractive power of the second lens L2. As a result, the balance of the refractive powers of the second lens L2 and the third lens L3 can be favorably maintained, and the generation of various aberrations can be suppressed. By maintaining the refractive power of the third lens L3 with respect to the refractive power of the second lens L2 such that the value of f3/f2 is not greater than or equal to the upper limit defined in Conditional Formula (7), the positive refractive power of the third lens L3 will not become excessively strong with respect to the refractive power of the second lens L2. As a result, the balance of the refractive powers of the second lens L2 and the third lens L3 can be favorably maintained, and the generation of various aberrations can be suppressed. It is preferable for Conditional Formula (7-1) to be satisfied, in order to cause these advantageous effects to become more prominent.

$$-4<f3/f2<-1.5 \tag{7-1}$$

In addition, it is preferable for the focal length f1 of the first lens L1 and the focal length f5 of the fifth lens L5 to satisfy Conditional Formula (8) below:

$$1.15<f1/f5<3 \tag{8}$$

Conditional Formula (8) defines a preferable range of numerical values for the ratio of the focal length f1 of the first lens L1 with respect to the focal length f5 of the fifth lens L5. It is preferable for the positive refractive power of the fifth lens L5 to be secured with respect to the positive refractive power of the first lens L1 such that the value of f1/f5 is not less than or equal to the lower limit defined in Conditional Formula (8). In this case, the positive refractive power of the fifth lens L5 can be secured, and increases in the incident angle of light rays that pass through the optical system and enter the image formation plane (imaging element) can be suppressed at intermediate angles of view. In addition, is preferable for the positive refractive power of the fifth lens L5 to be secured with respect to the positive refractive power of the first lens L1 such that the value of f1/f5 is not greater than or equal to the upper limit defined in Conditional Formula (8). In this case, the positive refractive power of the first lens L1 will not become excessively weak with respect to the positive refractive power of the fifth lens L5. This configuration is advantageous from the viewpoint of shortening the total length of the lens. It is preferable for Conditional Formula (8-1) to be satisfied, in order to cause these advantageous effects to become more prominent.

$$1.2<f1/f5<2 \tag{8-1}$$

In addition, it is preferable for the thickness CT3 of the third lens L3 along the optical axis and the thickness CT4 of the fourth lens L4 along the optical axis to satisfy Conditional Formula (9) below:

$$1<CT3/CT4<6 \tag{9}$$

Conditional Formula (9) defines a preferred range of numerical values of the ratio of the thickness CT3 of the third lens L3 along the optical axis with respect to the thickness CT4 of the fourth lens L4 along the optical axis. By securing the thickness CT3 of the third lens L3 along the optical axis with respect to the thickness CT4 of the fourth lens L4 along the optical axis such that the value of CT3/CT4 is not less than or equal to the lower limit defined in Conditional Formula (9), configuring the imaging lens L such that the position at which a principal ray of light exits the surface of the fourth lens L4 toward the image side is sufficiently high when viewed from the optical axis is facilitated. Therefore, such a configuration is advantageous from the viewpoint of correcting aberrations in a well balanced manner from a central angle of view to peripheral angles of view. In addition, by maintaining the thickness CT3 of the third lens L3 along the optical axis with respect to the thickness CT4 of the fourth lens L4 along the optical axis such that the value of CT3/CT4 is not greater than or equal to the upper limit defined in Conditional Formula (9), configuring the imaging lens L such that the position at which a axial marginal ray of light exits the surface of the fourth lens L4 toward the image side is sufficiently high when viewed from the optical axis is facilitated. Therefore, such a configuration is advantageous from the viewpoint of correcting spherical aberration. It is more preferable for Conditional Formula (9-1) to be satisfied, in order to cause these advantageous effects to become more prominent.

$$1.5<CT3/CT4<5 \quad (9\text{-}1)$$

In addition, it is preferable for the thickness CT5 of the fifth lens L5 along the optical axis and the thickness CT6 of the sixth lens L6 along the optical axis to satisfy Conditional Formula (10) below:

$$1.7<CT5/CT6<5 \quad (10)$$

Conditional Formula (10) defines a preferred range of numerical values of the ratio of the thickness CT5 of the fifth lens L5 along the optical axis with respect to the thickness CT6 of the sixth lens L6 along the optical axis. By setting the thickness CT5 of the fifth lens L5 along the optical axis with respect to the thickness CT6 of the sixth lens L6 along the optical axis such that the value of CT5/CT6 is not less than or equal to the lower limit defined in Conditional Formula (10), distortion can be favorably corrected. In addition, by setting the thickness CT5 of the fifth lens L5 along the optical axis with respect to the thickness CT6 of the sixth lens L6 along the optical axis such that the value of CT5/CT6 is not greater than or equal to the upper limit defined in Conditional Formula (10), balance can be maintained between the thickness CT5 of the fifth lens L5 along the optical axis and the thickness CT6 of the sixth lens L6 along the optical axis, which is advantageous from the viewpoint of shortening the total length of the lens. It is more preferable for Conditional Formula (10-1) to be satisfied, in order to cause these advantageous effects to become more prominent.

$$1.9<CT5/CT6<4 \quad (10\text{-}1)$$

In addition, it is preferable for the paraxial radius of curvature L3$f$ of the surface of the third lens L3 toward the object side and the paraxial radius of curvature L3$r$ of the surface of the third lens L3 toward the image side to satisfy Conditional Formula (11) below:

$$2.3<(L3r-L3f)/(L3r+L3f)<8.5 \quad (11)$$

Conditional Formula (11) defines a preferable range of numerical values related to the paraxial radius of curvature L3$f$ of the surface of the third lens L3 toward the object side and the paraxial radius of curvature L3$r$ of the surface of the third lens L3 toward the image side. By configuring the imaging lens L such that the value of (L3$r$−L3$f$)/(L3$r$+L3$f$) is not less than or equal to the lower limit defined in Conditional Formula (11), the absolute value of the paraxial radius of curvature L3$r$ of the surface of the third lens L3 toward the image side can be prevented from becoming excessively small, and spherical aberration can be favorably corrected as a result. By configuring the imaging lens L such that the value of (L3$r$−L3$f$)/(L3$r$+L3$f$) is not greater than or equal to the upper limit defined in Conditional Formula (11), the absolute value of the paraxial radius of curvature L3$f$ of the surface of the third lens L3 toward the object side can be prevented from becoming excessively small, and astigmatism can be favorably corrected as a result. It is preferable for Conditional Formula (11-1), in order to cause these advantageous effects to become more prominent.

$$2.5<(L3r-L3f)/(L3r+L3f)<8 \quad (11\text{-}1)$$

In addition, it is preferable for the paraxial radius of curvature L6$f$ of the surface of the sixth lens L6 toward the object side and the paraxial radius of curvature L6$r$ of the surface of the sixth lens L6 toward the image side to satisfy Conditional Formula (12) below:

$$-20<(L6r-L6f)/(L6r+L6f)<-3.5 \quad (12)$$

Conditional Formula (12) defines a preferable range of numerical values related to the paraxial radius of curvature L6$f$ of the surface of the sixth lens L6 toward the object side and the paraxial radius of curvature L6$r$ of the surface of the sixth lens L6 toward the image side. By configuring the imaging lens L such that the value of (L6$r$−L6$f$)/(L6$r$+L6$f$) is not less than or equal to the lower limit defined in Conditional Formula (12), spherical aberration and longitudinal chromatic aberration can be favorably corrected. By configuring the imaging lens L such that the value of (L6$r$−L6$f$)/(L6$r$+L6$f$) is not greater than or equal to the upper limit defined in Conditional Formula (12), the negative refractive power of the sixth lens L6 can be favorably secured, and the total length of the lens can be favorably shortened. It is preferable for Conditional Formula (12-1), in order to cause these advantageous effects to become more prominent.

$$-16<(L6r-L6f)/(L6r+L6f)<-4.5 \quad (12\text{-}1)$$

In addition, it is preferable for the focal length f of the entire system, the half value ω of a maximum angle of view when in a state of focus on an object at infinity, and the paraxial radius of curvature L6$r$ of the surface of the sixth lens L6 toward the image side to satisfy Conditional Formula (13) below:

$$0.5<f\cdot\tan\omega/L6r<20 \quad (13)$$

Conditional Formula (13) defines a preferable range of numerical values for the ratio of a paraxial image height (f·tan ω) with respect to the paraxial radius of curvature L6$r$ of the surface of the sixth lens L6 toward the image side. By setting the paraxial image height (f·tan ω) with respect to the paraxial radius of curvature L6$r$ of the surface of the sixth lens L6 toward the image side such that the value of f·tan ω/L6$r$ is not less than or equal to the lower limit defined in Conditional Formula (13), the absolute value of the paraxial radius of curvature L6$r$ of the surface of the sixth lens L6 toward the image side, which is the surface most toward the image side in the imaging lens L, will not be excessively large with respect to the paraxial image height (f·tan ω). As a result, spherical aberration, longitudinal chromatic aberration, and field curvature can be sufficiently corrected while realizing a shortening of the total length. Note that field curvature can be favorably corrected from a central angle of view to peripheral angles of view in the case that in the case that the sixth lens L6 is of an aspherical shape having a concave surface toward the image side and at least one inflection point as in the imaging lenses L of each of the Examples, and in the case that the lower limit of Conditional Formula (13) is satisfied. Therefore, this configuration is advantageous from the viewpoint of realizing a wide angle of view. In addition, by setting the paraxial image height (f·tan ω) with respect to the paraxial radius of curvature L6r of the surface of the sixth lens L6 toward the image side such that the value of f·tan ω/L6r is not greater than or equal to the upper limit defined in Conditional Formula (6), the absolute value of the paraxial radius of curvature L6r of the surface of the sixth lens L6 toward the image side, which is the surface most toward the image side in the imaging lens, will not be excessively small with respect to the paraxial image height (f·tan ω). Thereby, increases in the incident angle of light rays that pass through the optical system and enter the image formation plane (imaging element) can be suppressed, particularly at intermediate angles of view. In addition, excessive correction of field curvature can be suppressed.

Here, two preferred examples of configurations of the imaging lens L and the advantageous effects obtained thereby will be described. Note that these two preferred examples may adopt the preferred configurations of the imaging lens L described above as appropriate.

The first example is an imaging lens L consisting essentially of six lenses, including: a first lens having a positive refractive power and a convex surface toward the object side; a second lens having a negative refractive power and a convex surface toward the object side; a third lens having a positive refractive power; a fourth lens having a positive refractive power; a fifth lens having a positive refractive power and a convex surface toward the object side; and a sixth lens having a negative refractive power, provided in this order from the object side. The imaging lens L satisfies Conditional Formula (1). According to the first preferred example, the total length of the lens can be favorably shortened, particularly because Conditional Formula (1) is satisfied.

The second example is an imaging lens L consisting essentially of six lenses, including: a first lens having a positive refractive power and a convex surface toward the object side; a second lens having a negative refractive power and a convex surface toward the object side; a third lens having a positive refractive power and a convex surface toward the image side; a fourth lens having a positive refractive power; a fifth lens having a positive refractive power and a convex surface toward the object side; and a sixth lens having a negative refractive power, provided in this order from the object side. According to the second preferred example, securing the positive refractive power of the third lens L3 is facilitated while the generation of astigmatism is suppressed, particularly because the third lens L3 has a convex surface toward the image side in the vicinity of the optical axis, which is advantageous from the viewpoint of shortening the total length of the lens.

As described above, in the imaging lens L according to the embodiments of the present invention, the configurations of each lens element is optimized in a lens configuration having a total of six lenses. Therefore, a lens system that achieves a shortened total length and a widened angle of view, which is compatible with imaging elements that satisfy demand for a greater number of pixels and has high imaging performance from a central angle of view to peripheral angles of view, can be realized.

For example, the imaging lenses disclosed in International Patent Publication No. WO2014/006822, U.S. Patent Application Publication No. 20120188654, U.S. Patent Application Publication No. 20120262806, Taiwanese Patent Publication No. 201331663, and Korean Patent Publication No. 10-2011-0024872 are configured such that a ratio TTL/ImgH of a distance TTL from the surface of a first lens toward the object side to an image formation plane along the optical axis (back focus is an air converted length) with respect to a half value of an image size ImgH is within a range from 1.52 to 2.02. In contrast, the embodiments described in the present specification are configured such that the values of TTL/ImgH are within a range from 1.39 to 1.42, and a shortening of the total length of the lens with respect to image sizes is favorably realized. In addition, in the case that the lens configurations of each of the first lens L1 through the sixth lens L6 of the imaging lens L are set such that the maximum angle of view in a state focused on an object at infinity is 80 degrees or greater as in the imaging lenses of the first through sixth embodiments, the imaging lens L may be favorably applied for use in imaging apparatuses such as cellular telephones, and can meet demand regarding widening of the angle of view. In addition, in the case that the lens configurations of each of the first lens L1 through the sixth lens L6 of the imaging lens L are set such that F number is 2.0 or less as in the imaging lenses of the first through sixth embodiments, the imaging lens L may be favorably applied for use with imaging elements that satisfy demand for an increased number of pixels.

In addition, further improved imaging performance can be realized by satisfying the above preferred conditions appropriately. In addition, the imaging apparatuses according to the embodiments of the present invention output image signals corresponding to optical images formed by the high performance imaging lenses according to the embodiments of the present invention. Therefore, photographed images having high resolution from a central angle of view to peripheral angles of view can be obtained.

Next, specific examples of numerical values of the imaging lens of the present invention will be described. A plurality of examples of numerical values will be summarized and explained below.

Table 1 and Table 2 below show specific lens data corresponding to the configuration of the imaging lens illustrated in FIG. 1. Table 1 shows basic lens data of the imaging lens, and Table 2 shows data related to aspherical surfaces. In the lens data of Table 1, ith lens surface numbers that sequentially increase from the object side to the image side, with the lens surface at the most object side designated as first, are shown in the column Si for the imaging lens of Example 1. The radii of curvature (mm) of ith surfaces from the object side corresponding to the symbols Ri illustrated in FIG. 1 are shown in the column Ri. Similarly, the distances (mm) between an ith surface Si and an i+1st surface Si+1 from the object side along the optical axis Z are shown in the column Di. The refractive indices of jth optical elements from the object side with respect to the d line (wavelength: 587.6 nm) are shown in the column Ndj. The Abbe's numbers of the jth optical elements with respect to the d line are shown in the column νdj.

Table 1 also shows the aperture stop St and the optical member CG. In Table 1 "(St)" is indicated along with a surface number in the row of the surface number of the surface that corresponds to the aperture stop St, and "(IMG)" is indicated along with a surface number in the row of the surface number of the surface that corresponds to the imaging surface. The signs of the radii of curvature are positive for surface shapes having convex surfaces toward the object side, and negative for surface shapes having convex surfaces toward the image side. Note that the values of the focal length f (mm) of the entire system, the back focus Bf (mm), the F number Fno. and the maximum angle of view 2ω (°) in a state focused on an object at infinity are shown as data above the lens data. Note that the back focus Bf is represented as an air converted value.

In the imaging lens of Example 1, both of the surfaces of the first lens L1 through the sixth lens L6 are all aspherical in shape. In the basic lens data of Table 1, numerical values of radii of curvature in the vicinity of the optical axis (paraxial radii of curvature) are shown as the radii of curvature of the aspherical surfaces.

Table 2 shows aspherical surface data of the imaging lens of Example 1. In the numerical values shown as the aspherical surface data, the symbol "E" indicates that the numerical value following thereafter is a "power index" having 10 as a base, and that the numerical value represented by the index function having 10 as a base is to be multiplied by the numerical value in front of "E". For example, "1.0E-02" indicates that the numerical value is "1.0·10$^{-2}$".

The values of coefficients An and KA represented by the aspherical surface shape formula (A) below are shown as the aspherical surface data. In greater detail, Z is the length (mm) of a normal line that extends from a point on the aspherical surface having a height h to a plane (a plane perpendicular to the optical axis) that contacts the apex of the aspherical surface.

$$Z = \frac{C \times h^2}{1 + \sqrt{1 - KA \times C^2 \times h^2}} + \sum_n An \times h^n \quad (A)$$

wherein: Z is the depth of the aspherical surface (mm), h is the distance from the optical axis to the surface of the lens (height) (mm), C is the paraxial curvature=1/R (R is the paraxial radius of curvature), An is an nth ordinal aspherical surface coefficient (n is an integer 3 or greater), and KA is an aspherical surface coefficient.

Specific lens data corresponding to the configurations of the imaging lenses illustrated in FIG. 2 through FIG. 6 are shown in Table 3 through Table 12 as Example 2 through Example 6. In the imaging lenses of Examples 1 through 6, both of the surfaces of the first lens L1 through the sixth lens L6 are all aspherical surfaces.

Figure 8:
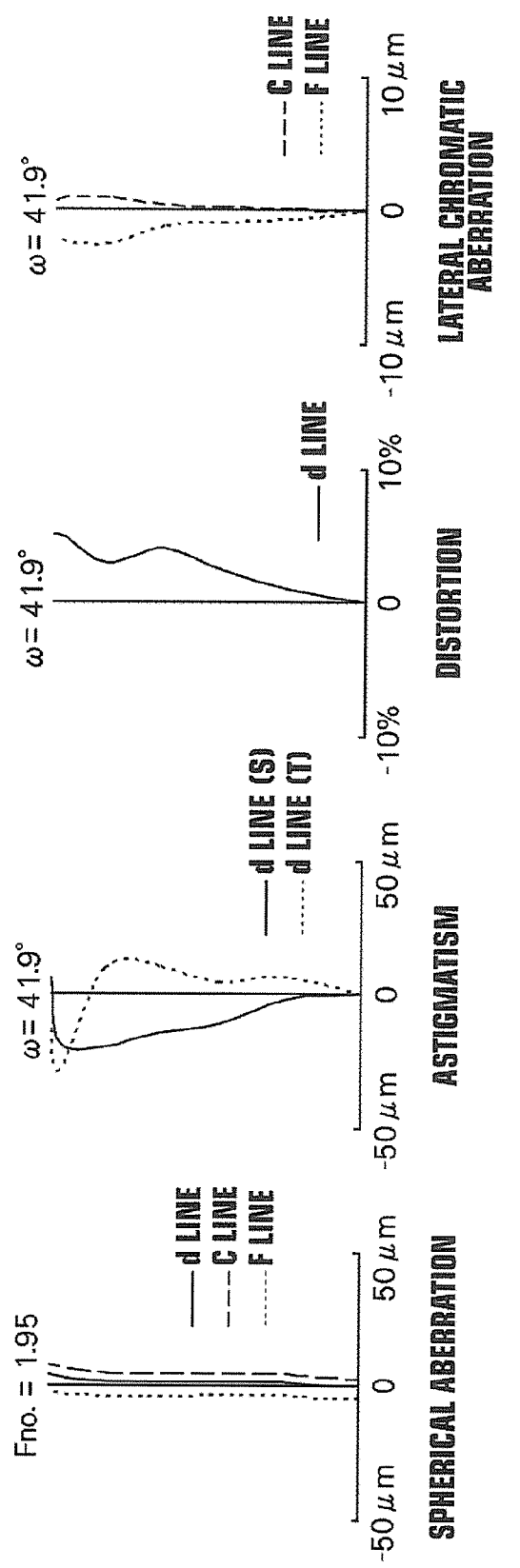
FIG. 8 is a collection of diagrams that illustrate aberrations of the imaging lens of Example 1, wherein the diagrams illustrate spherical aberration, astigmatism, distortion, and lateral chromatic aberration, in this order from the left side of the drawing sheet.
Figure 9:
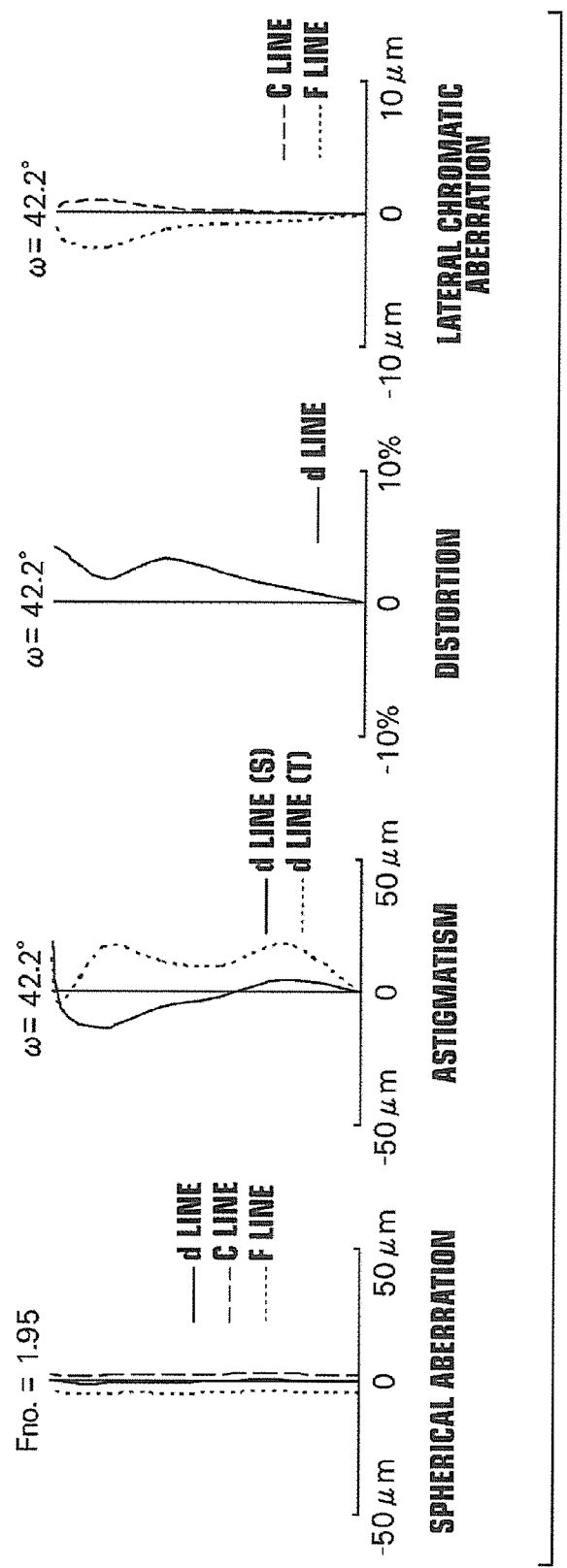
FIG. 9 is a collection of diagrams that illustrate aberrations of the imaging lens of Example 2, wherein the diagrams illustrate spherical aberration, astigmatism, distortion, and lateral chromatic aberration, in this order from the left side of the drawing sheet.
Figure 10:
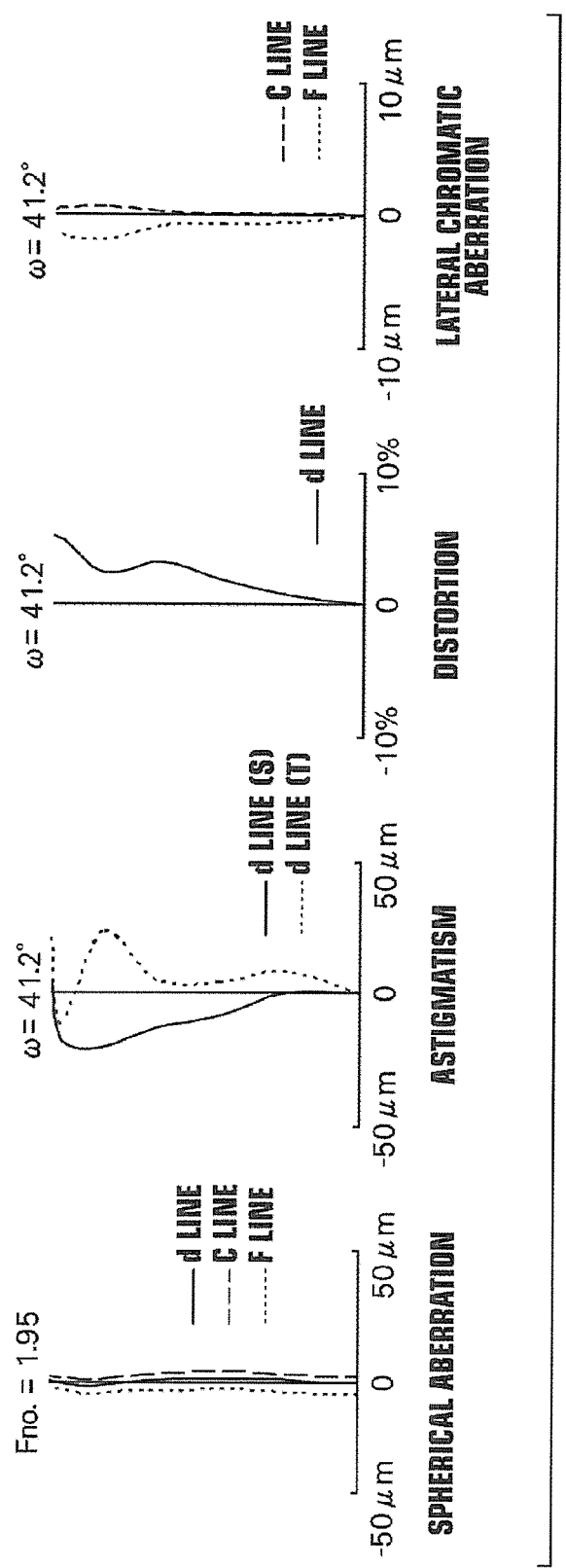
FIG. 10 is a collection of diagrams that illustrate aberrations of the imaging lens of Example 3, wherein the diagrams illustrate spherical aberration, astigmatism, distortion, and lateral chromatic aberration, in this order from the left side of the drawing sheet.
Figure 11:
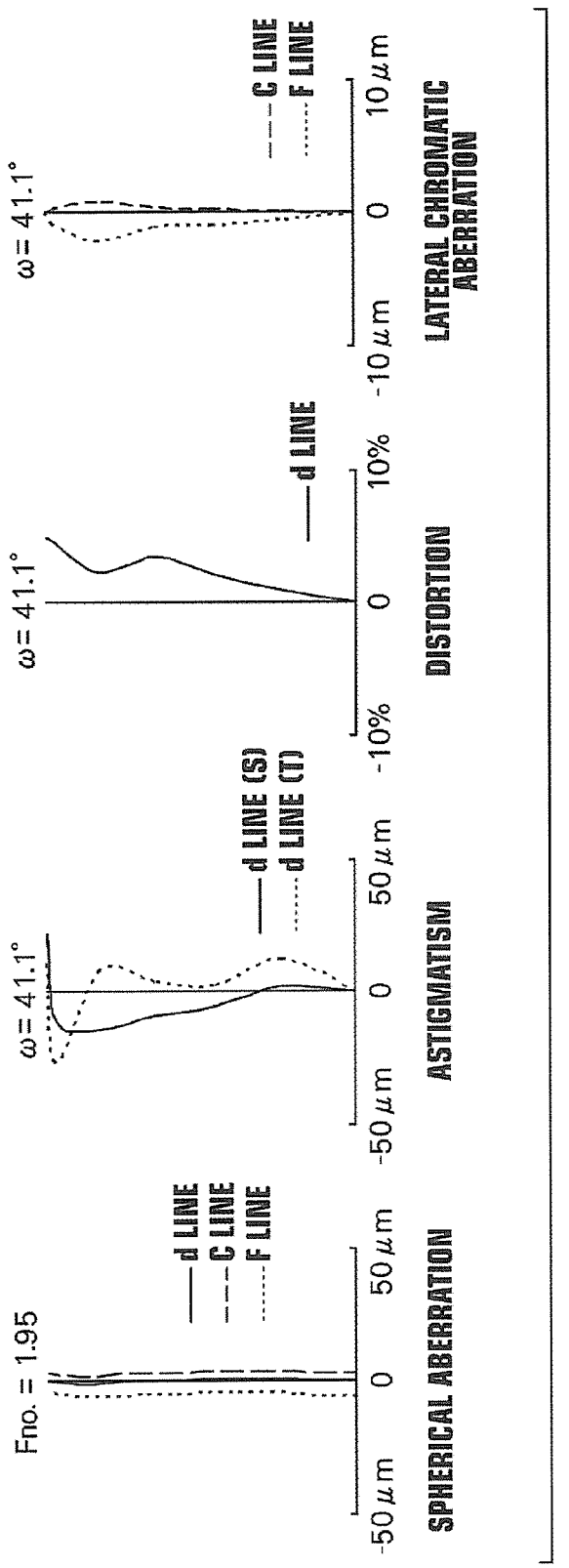
FIG. 11 is a collection of diagrams that illustrate aberrations of the imaging lens of Example 4, wherein the diagrams illustrate spherical aberration, astigmatism, distortion, and lateral chromatic aberration, in this order from the left side of the drawing sheet.
Figure 12:
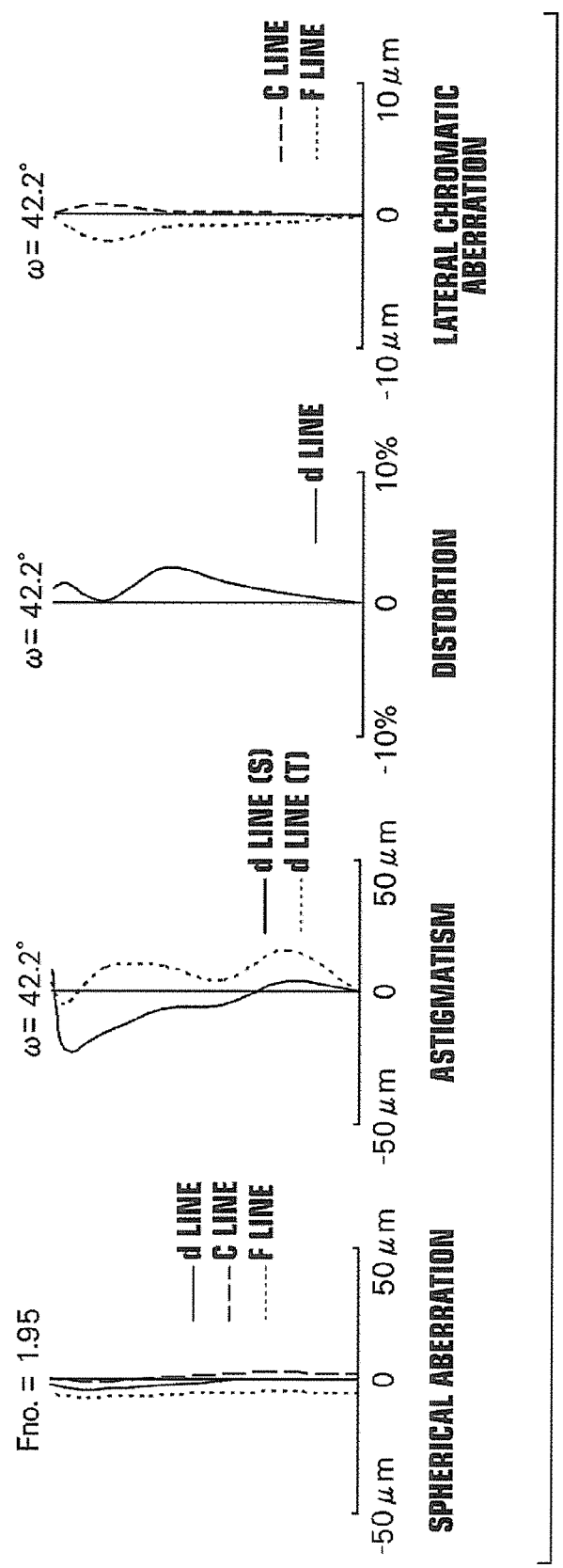
FIG. 12 is a collection of diagrams that illustrate aberrations of the imaging lens of Example 5, wherein the diagrams illustrate spherical aberration, astigmatism, distortion, and lateral chromatic aberration, in this order from the left side of the drawing sheet.
Figure 13:
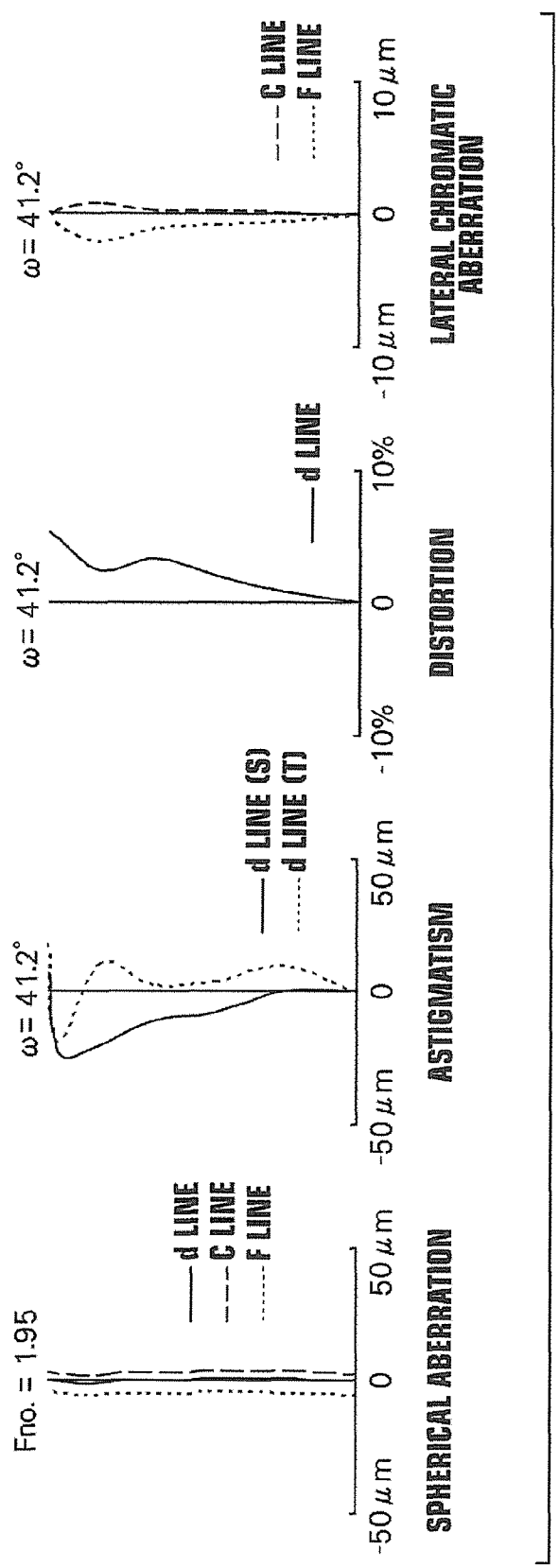
FIG. 13 is a collection of diagrams that illustrate aberrations of the imaging lens of Example 6, wherein the diagrams illustrate spherical aberration, astigmatism, distortion, and lateral chromatic aberration, in this order from the left side of the drawing sheet.

FIG. 8 is a collection of diagrams that illustrate aberrations of the imaging lens of Example 1, wherein the diagrams illustrate the spherical aberration, the astigmatism, the distortion, and the lateral chromatic aberration (chromatic aberration of magnification) of the imaging lens of Example 1, respectively, in this order from the left side of the drawing sheet. Each of the diagrams that illustrate the spherical aberration, the astigmatism (field curvature), and the distortion illustrate aberrations using the d line (wavelength: 587.6 nm) as a reference wavelength. The diagram that illustrates spherical aberration also shows aberrations related to the F line (wavelength: 486.1 nm), the C line (wavelength: 656.3 nm) and the g line (wavelength: 435.83 nm). The diagram that illustrates lateral chromatic aberration shows aberrations related to the F line, the C line, and the g line. In the diagram that illustrates astigmatism, aberration in the sagittal direction (S) is indicated by a solid line, while aberration in the tangential direction (T) is indicated by a broken line. In addition, "Fno." denotes F numbers, and "ω" denotes a half value of the maximum angle of view in a state focused on an object at infinity.

Similarly, the aberrations of the imaging lens of Example 2 through Example 6 are illustrated in FIG. 9 through FIG. 13. The diagrams that illustrate aberrations of FIG. 9 through FIG. 13 are all for cases in which the object distance is infinity.

Table 13 shows values corresponding to Conditional Formulae (1) through (13), respectively summarized for each of Examples 1 through 6.

As can be understood from each set of numerical value data and from the diagrams that illustrate aberrations, each of the Examples realize a shortening of the total length of the lens, a widened angle of view, and high imaging performance.

Hereinafter, an example of a camera module for incorporating the imaging lens L into a comparatively compact imaging device such as a cellular telephone, a smart phone, and a tablet type terminal will be described with reference to FIGS. 16 through 19.

Figure 16:
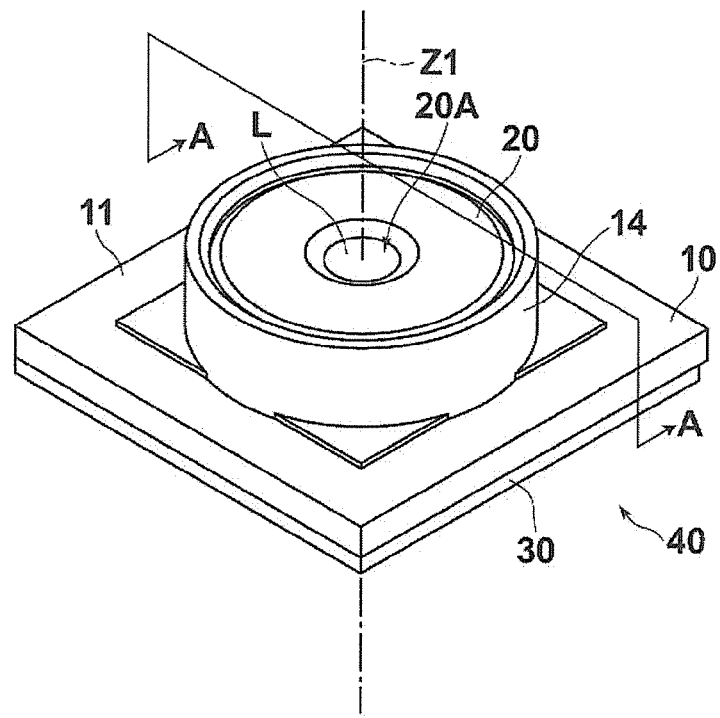
FIG. 16 is a perspective view that illustrates a camera module equipped with the imaging lens of FIG. 1.
Figure 17:
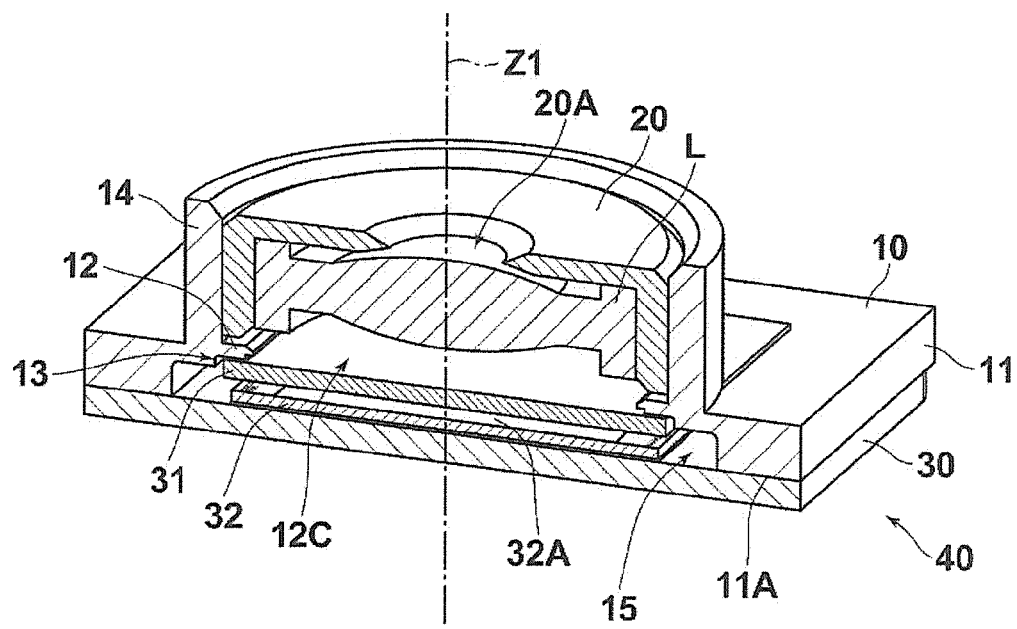
FIG. 17 is a perspective sectional view that illustrates an A-A cross section of the camera module of FIG. 16.
Figure 18:
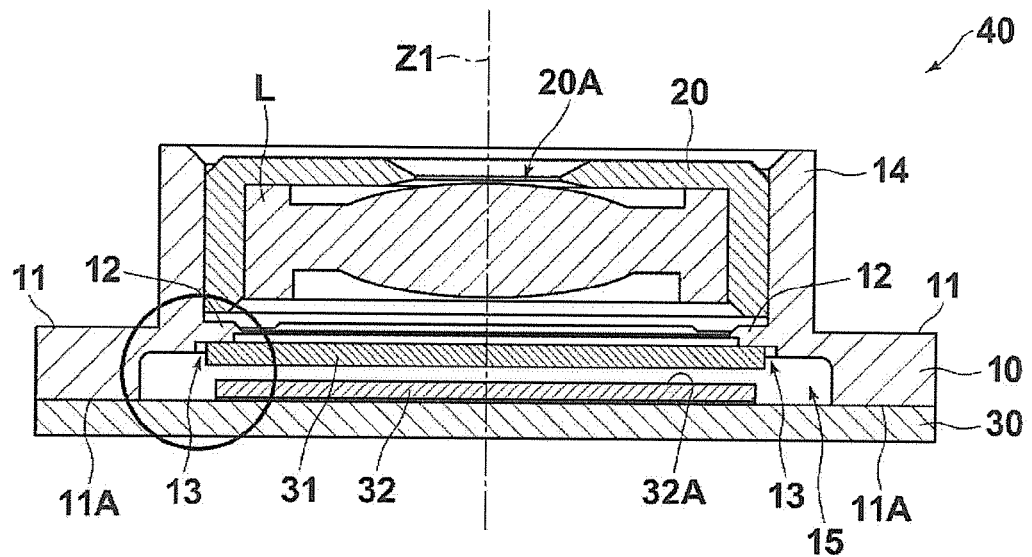
FIG. 18 is a sectional view of the camera module of FIG. 16 taken along the line A-A.
Figure 19:
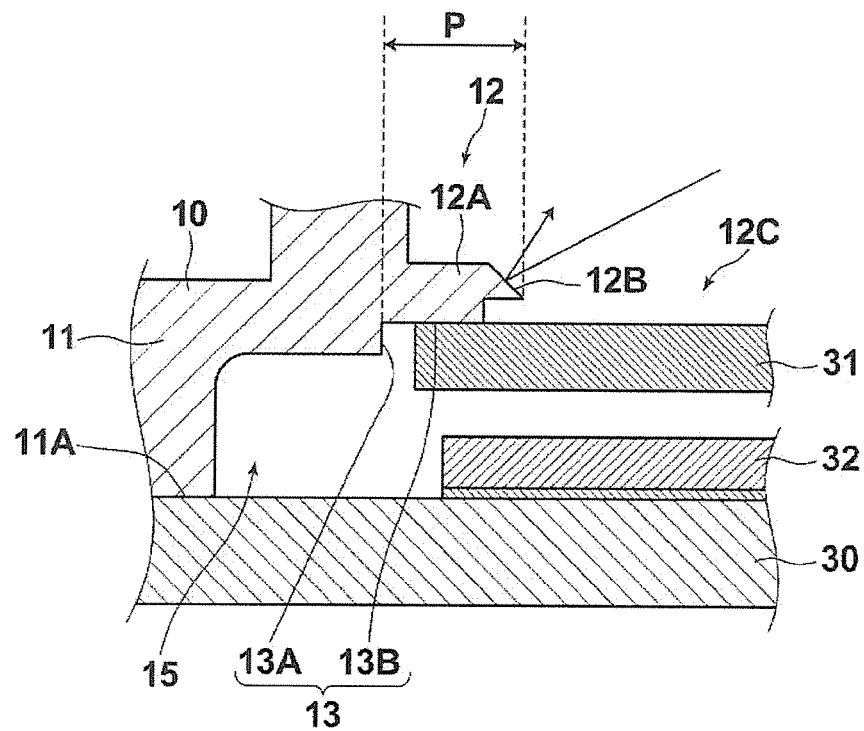
FIG. 19 is a partially magnified view (cut out end surface view) of the main portion of FIG. 18.

FIG. 16 is a perspective view that illustrates a camera module 40. FIG. 17 is a perspective sectional view that illustrates an A-A cross section of the camera module 40 of FIG. 16. FIG. 18 is a sectional view of the camera module 40 of FIG. 16 taken along the line A-A. FIG. 19 is a partially magnified view (cut out end surface view) of the portion of FIG. 18 indicated by a circle. Note that the imaging lens L constituted by the first through sixth lenses L1 through L6 and the aperture stop St illustrated in FIG. 1 is employed as the imaging lens L in FIG. 16. The imaging lens L constituted by the first through sixth lenses L1 through L6 and the aperture stop St is simplified and represented as a single lens in FIGS. 16 through 19. Here, the shapes of the optical surfaces of the lenses L1 through L6 of the imaging lens L illustrated in FIG. 1 and the details of the arrangements thereof will be omitted in order to avoid redundant descriptions, and the other structures of the camera module will be described in detail.

As illustrated in FIGS. 16 through 19, the camera module 40 is equipped with: the imaging lens L; a lens barrel 20 that positions and supports the lenses L1 through L6 and the aperture stop St that constitute the imaging lens L at desired positions in a state in which the optical axes thereof are matched; a substantially rectangular infrared ray cutoff filter 31 in the form of a thin plate, which is provided between the imaging lens L and the image formation plane (imaging surface) of the imaging lens L; a substantially rectangular imaging element 32 in the form of a thin plate, which is provided such that an imaging surface 32A thereof is positioned at the image formation plane of the imaging lens L; a circuit board 30, on which the imaging element 32 (as well as necessary wiring, electronic components, etc., which are not shown) is provided; and a holding member 10, which is mounted onto the circuit board 30 so as to cover the circuit board 30, that positions and holds the lens barrel 20 and the infrared ray cutoff filter 31 with respect to the image formation plane (the imaging surface of the imaging element) of the imaging lens L. In the camera module 40, light beams from the object side enter through an open portion 20A provided at the object side of the lens barrel 20, pass through the imaging lens L and the infrared ray cutoff filter 31, and are received by the imaging surface 32A of the imaging element 32.

The holding member 10 is equipped with: a lens barrel holding portion 14 that holds the lens barrel 20 at the outer peripheral portion thereof; a shielding portion 12 positioned at the image side of the lens barrel 20 that shuts out unnecessary light, to be described in detail later, that propagates toward an inner peripheral surface 13A parallel to the optical axis; a filter holding portion 13 positioned at the image side of the shielding portion 12 that holds the infrared ray cutoff filter 31 at the outer peripheral portion thereof; a cover portion 11, onto an abutment surface 11A thereof the circuit board 30 is adhesively fixed to provided at the outer periphery of a region of the circuit board 30 in which the imaging element 32 and the like are provided, that covers the surface of the circuit board 30 toward the object side; and a recess 15 that houses the imaging element 32 such as a CCD provided on the circuit board 30 as well as other necessary components such as electric components and wiring in a state in which the circuit board 30 is adhesively attached to the cover portion 11. The holding member 10 is integrally formed out of a resin material by injection molding.

The lens barrel holding portion 14 is configured as a circular cylinder having an inner diameter which is slightly greater than the outer diameter of the lens barrel 20. The lens barrel holding portion 14 holds the lens barrel 20 by a female threaded portion (not shown) formed in the inner periphery of the lens barrel holding portion 14 and a male threaded portion (not shown) formed on the outer periphery of the lens barrel 20 engaging each other. In addition, the lens barrel holding portion 14 is provided such that the optical axis of the imaging lens L held by the lens barrel 20 is perpendicular to the imaging surface of the imaging element 32 in a state that the holding member 10 is fixed to the circuit board 30, and such that the imaging surface of the imaging element 32 is positioned at the image formation plane of the imaging lens L. Note that here, a the camera module 40 is being explained as an example of the fixed focus type. However, the cameral module may be equipped with an automatic focus function. In this case, any desired configuration which is capable of realizing an automatic focus function may be applied to the camera module. For example, the lens barrel holding portion 14 may be omitted from the holding member 10 of the above camera module 40, and a driving unit (not shown) equipped with: a driving means that moves the lens barrel 20 having the imaging lens L provided therein forward and backward in the direction of the optical axis; and a guide portion for guiding and supporting the lens barrel 20 such that the lens barrel 20 can move forward and backward in the direction of the optical axis, may be provided.

As illustrated in FIG. 19, the filter holding portion 13 is constituted by a inner peripheral surface 13a configured as a cylindrical shape, in which the substantially rectangular infrared ray cutoff filter 31 in the form of a thin plate is capable of being fitted into, and an abutment surface 13B that abuts the outer peripheral portion of the surface of the infrared ray cutoff filter 31 toward the object side. The outer peripheral portion of the infrared ray cutoff filter 31 is held by an adhesive agent coated on the abutment surface 13B. In addition, the inner peripheral surface 13A is a surface parallel to the optical axis, and forms a cylindrical shape having a rectangular cross section that corresponds to the outer peripheral surface of the infrared ray cutoff filter 31. In addition, the filter holding portion 13 is provided to position the infrared ray cutoff filter 31 at a predetermined position with respect to the image formation plane of the imaging lens L (the imaging surface of the imaging element 32).

As described above, there are cases in which an inner peripheral surface that surrounds the outer periphery of an optical filter, such as the infrared ray cutoff filter 31, as a structure into which the optical filter is fitted to engage the camera module 40, when the optical filter is incorporated into the camera module 40. Such an inner peripheral surface that surrounds the outer periphery of the optical filter may be a surface which is parallel to the optical axis. however, in the case that an inner peripheral surface which is parallel to the optical axis is present between the imaging lens L and the imaging element 32, there are cases in which unnecessary light is reflected at the inner peripheral surface parallel to the optical axis and enters the imaging element 32, causing the generation of ghosts and flare.

In the camera module 40, the holding member 10 is equipped with the shielding portion 12 that shuts out unnecessary light that propagates toward the inner peripheral surface 13A, which is parallel to the optical axis. The shielding portion 12 is positioned at the object side of the inner peripheral surface 13A so as to be capable of shutting out unnecessary light that propagates toward the inner peripheral surface 13A. The shielding portion 12 is of a rib shape that protrudes from the inner peripheral surface 13A toward the optical axis for a predetermined height (refer to P of FIG. 19) across the entire inner peripheral surface 13A. The inner peripheral edge of the shielding portion 12 forms an opening 12C through which light rays that contribute to image formation pass. Here, the shielding portion 12 forms a substantially rectangular opening 12C that approximates the substantially rectangular shape formed by the inner peripheral surface 13A.

According to the camera module 40 described above, the shielding portion 12 that shuts out unnecessary light that propagates toward the inner peripheral surface 13A, which is provided at a position between the imaging lens L and the imaging element 32 where the unnecessary light is capable of reaching, is provided between the imaging lens L and the inner peripheral surface 13A. Therefore, the amounts of ghosts and flare caused be unnecessary light being reflected by the inner peripheral surface 13A can be reduced. As a result, deterioration of image quality due to ghosts and flare can be suppressed.

In addition, it is preferable for the shielding portion 12 to be configured to reduce the number of surfaces which are parallel to the optical axis as much as possible (to have as few surfaces which are parallel to the optical axis as possible) at regions at which there is a possibility that unnecessary light may reach, in order to prevent the generation of ghosts and flare. For example, it is preferable for the inner peripheral edge portion of the shielding portion 12 to be constituted by an inclined surface 12B which is inclined with respect to the optical axis, as illustrated in FIGS. 17 through 19. In this case, the inclined surface 12B can reflect or diffuse unnecessary light in directions that do not contribute to image formation, and the generation of ghosts and flare can be suppressed further. In addition, in the case that a vector normal to the inclined surface 12B and an optical axis vector oriented toward the image side parallel to the optical axis form an obtuse angle as shown in FIGS. 17 through 19, unnecessary light can be more effectively reflected or diffused in directions that do not contribute to image formation. The inclined surface 12B may have an inclination such that a vector normal to the inclined surface 12B and an optical axis vector oriented toward the image side parallel to the optical axis form an obtuse angle. In addition, the inner peripheral edge portion of the shielding portion 12 may be constituted by a plurality of inclines surfaces having inclinations different from each other.

In addition, in the case that the shielding portion 12 is of a shape having a sharp peak at the inner peripheral edge portion thereof, it is preferable for a mold employed to produce the holding member 10 by injection molding to be designed such that the position of the peak of the inner peripheral edge portion of the shielding portion 12 is the joint of the mold. In this case, processing the inner peripheral edge of the shielding portion 12 to a desired shape is facilitated, and reflection of unnecessary light being reflected by excess protrusions (burrs), which are likely to be unintentionally formed at the joints of molds, can be suppressed.

In addition, in the case that the shielding portion 12 is provided in the vicinity of the object side of the inner peripheral surface 13A, and a portion of the shielding portion 12 functions as the abutment surface 13B that supports the infrared ray cutoff filter 31, the tolerance for each component can be increased, the assembly tolerance can be increased, and the number of production steps can be decreased, compared to a case in which the shielding portion is realized by a separate shielding plate or by a film coated on the infrared ray cutoff filter 31. The configuration of the present invention is advantageous from the viewpoint of facilitating production.

In addition, it is preferable for surface processing that causes unnecessary light to be absorbed or diffused to be administered on regions of the shielding portion 12 that unnecessary light may reach. For example, it is preferable for a coating material having an unnecessary light absorbing function to be coated on the inclined surface 12B (and/or the surface 12A of the shielding portion 12 toward the object side) of the shielding portion 12. Alternatively, fine protrusions and recesses having an unnecessary light diffusing function may be provided on the inclined surface 12B (and/or the surface 12A of the shielding portion 12 toward the object side) of the shielding portion 12. In these cases, the amount of unnecessary light which is reflected at the inclined surface 12B (and/or the surface 12A of the shielding portion 12 toward the object side) of the shielding portion 12 can be reduced, and the entry of unnecessary light into the imaging element 32 can be further favorably suppressed.

Note that the shielding portion 12 may be of any desired shape, size, and arrangement as long as it secures the size of an opening through which light rays that contribute to image formation pass, and protrudes toward the optical surface from the inner peripheral surface parallel to the optical axis so as to be capable of preventing unnecessary light from reaching the inner peripheral surface parallel to the optical axis.

Note that the filter holding portion 13 may hold other optical filters instead of the infrared ray cutoff filter. The thickness, the number, the shape, and the position of various optical filters may be set as appropriate, according to the imaging lens L and design requirements.

In addition, it is preferable for surface processing that causes unnecessary light to be absorbed or diffused to be administered onto surface regions of the holding member 10 that unnecessary light may reach other than the surface region of the shielding portion 12 as well. For example, it is preferable for a coating material having an unnecessary light absorbing function to be coated on regions at which reflection of unnecessary light is to be decreased. Alternatively, fine protrusions and recesses having an unnecessary light diffusing function may be provided on regions at which reflection of unnecessary light is to be decreased. The surface processing may also be preferably applied to the imaging lens constituted by a desired number of lenses, each of a desired lens shape.

In addition, the camera module 40 may be applied to various imaging apparatuses and may be applied to the imaging apparatuses 1 and 501 illustrated in FIGS. 14 and 15, for example. In addition, any of the imaging lenses L of the present invention may be employed in the camera module 40. Further, the camera module 40 is not limited to use with the imaging lenses L of the present invention, and may be utilized with any imaging lens.

Note that the imaging lens of the present invention is not limited to the embodiments and Examples described above, and various modifications are possible. For example, the values of the radii of curvature, the distances among surfaces, the refractive indices, the Abbe's numbers, the aspherical surface coefficients, etc., are not limited to the numerical values indicated in connection with the Examples of numerical values, and may be other values.

In addition, the Examples are described under the presumption that they are to be utilized with fixed focus. However, it is also possible for configurations capable of adjusting focus to be adopted. It is possible to adopt a configuration, in which the entirety of the lens system is fed out or a portion of the lenses is moved along the optical axis to enable automatic focus, for example.

TABLE 1

Example 1
$f = 2.51$, $Bf = 0.56$, $Fno. = 1.95$, $2\omega = 83.8$

| Si | Ri | Di | Ndj | vdj |
|---|---|---|---|---|
| *1 | 1.1903 | 0.4184 | 1.544 | 55.9 |
| *2 | −90.2819 | 0.0600 | | |
| 3 (St) | ∞ | 0.0186 | | |
| *4 | 36.9907 | 0.1700 | 1.650 | 21.4 |
| *5 | 2.3473 | 0.1081 | | |
| *6 | 6.9850 | 0.4900 | 1.544 | 55.9 |
| *7 | −10.4005 | 0.0770 | | |
| *8 | 99.5266 | 0.1749 | 1.650 | 21.4 |
| *9 | −99.0472 | 0.2012 | | |
| *10 | 88.2882 | 0.4997 | 1.544 | 55.9 |
| *11 | −0.9316 | 0.2069 | | |
| *12 | −1.4559 | 0.1809 | 1.544 | 55.9 |
| *13 | 1.2636 | 0.2500 | | |
| *14 | ∞ | 0.2500 | 1.517 | 64.2 |
| *15 | ∞ | 0.1483 | | |
| 16 (IMG) | ∞ | | | |

*aspherical surface

TABLE 2

Example 1: Aspherical Surface Data

| Surface Number | KA | A4 | A6 | A8 | A10 |
|---|---|---|---|---|---|
| 1 | 3.5207428E−01 | 2.8203772E−02 | 5.8910419E−02 | −1.7879513E−01 | 2.5612399E−01 |
| 2 | 9.4805184E+03 | 5.9899162E−02 | −9.8075302E−02 | 1.6444667E−01 | −4.1216827E−01 |

TABLE 2-continued

Example 1: Aspherical Surface Data

| | | | | | |
|---|---|---|---|---|---|
| 4 | 2.7752255E+03 | 1.0285113E-01 | 9.1544585E-02 | -1.9913176E-01 | 6.7842274E-02 |
| 5 | -1.7893827E+00 | 1.0284007E-01 | 2.4077372E-01 | 2.0245749E-01 | -1.9457530E+00 |
| 6 | 1.1096630E+02 | -1.5057870E-01 | -1.9784138E-01 | 3.6592000E-01 | -9.7471536E-01 |
| 7 | 1.8621709E+02 | -2.1677010E-01 | -2.1074487E-01 | 8.8975027E-02 | -6.9547601E-01 |
| 8 | 8.8013421E+03 | -4.3063913E-01 | -3.5136197E-01 | 2.6625323E-01 | 8.5525630E-02 |
| 9 | -1.1687680E+04 | -3.8398251E-01 | -1.4595329E-01 | 9.2121788E-02 | 1.3811854E-01 |
| 10 | -1.3320444E+05 | -1.2737507E-01 | -2.5125415E-01 | 1.6261524E+00 | -5.4370026E+00 |
| 11 | -4.0458503E+00 | -1.6515105E-01 | 1.9449510E-02 | 5.9778785E-01 | -5.9922674E-01 |
| 12 | -1.5237781E+00 | -5.6866581E-01 | 7.4723635E-01 | -7.1023498E-01 | 2.6199286E-01 |
| 13 | -1.3032976E+01 | -2.9180975E-01 | 3.6475182E-01 | -3.1727123E-01 | 1.6973976E-01 |

| Surface Number | A12 | A14 | A16 |
|---|---|---|---|
| 1 | -3.4030500E-01 | — | — |
| 2 | 2.8278734E-01 | — | — |
| 4 | 5.7959563E-01 | — | — |
| 5 | 4.0527287E+00 | — | — |
| 6 | -1.7098358E+00 | — | — |
| 7 | -1.6501388E-01 | — | — |
| 8 | -1.2425585E+00 | — | — |
| 9 | -2.7146665E-01 | — | — |
| 10 | 9.0218397E+00 | -7.6639312E+00 | 2.0907358E+00 |
| 11 | -1.6443250E-01 | 3.6303908E-01 | -1.0627777E-01 |
| 12 | 5.6037545E-02 | 7.2432743E-02 | -8.2368651E-02 |
| 13 | -6.2203415E-02 | 1.4910847E-02 | -1.6781164E-03 |

TABLE 3

Example 2
f = 2.50, Bf = 0.57, Fno. = 1.95, 2ω = 84.4

| Si | Ri | Di | Ndj | vdj |
|---|---|---|---|---|
| *1 | 1.1728 | 0.4027 | 1.544 | 55.9 |
| *2 | -92.4939 | 0.0601 | | |
| 3 (St) | ∞ | 0.0107 | | |
| *4 | 46.5614 | 0.1715 | 1.650 | 21.4 |
| *5 | 2.3593 | 0.1447 | | |
| *6 | 6.8480 | 0.4232 | 1.544 | 55.9 |
| *7 | -10.4584 | 0.0942 | | |
| *8 | 52.7064 | 0.1700 | 1.650 | 21.4 |
| *9 | 83.6970 | 0.1875 | | |
| *10 | 77.9529 | 0.4781 | 1.544 | 55.9 |
| *11 | -0.9407 | 0.2083 | | |
| *12 | -1.4821 | 0.2058 | 1.544 | 55.9 |
| *13 | 1.2447 | 0.2500 | | |
| *14 | ∞ | 0.2500 | 1.517 | 64.2 |
| *15 | ∞ | 0.1511 | | |
| 16 (IMG) | ∞ | | | |

*aspherical surface

TABLE 4

Example 2: Aspherical Surface Data

| Surface Number | KA | A4 | A6 | A8 | A10 |
|---|---|---|---|---|---|
| 1 | 3.2545804E-01 | 2.7537468E-02 | 5.5876260E-02 | -1.7752180E-01 | 2.6356089E-01 |
| 2 | 9.8969314E+03 | 5.7156313E-02 | -9.2176852E-02 | 1.7274708E-01 | -3.9798378E-01 |
| 4 | 3.5310340E+03 | 1.1256785E-01 | 1.0175697E-01 | -1.8262655E-01 | 5.8771633E-02 |
| 5 | -4.9448607E-01 | 1.1146134E-01 | 2.7786354E-01 | 1.9058188E-01 | -1.9515314E+00 |
| 6 | 1.0719146E+02 | -1.3215132E-01 | -2.1854063E-01 | 4.1082384E-01 | -6.9887362E-01 |
| 7 | 1.7856846E+02 | -2.2599453E-01 | -2.1212903E-01 | 1.1272842E-01 | -6.6488263E-01 |
| 8 | 3.7662905E+03 | -4.3132127E-01 | -3.4079704E-01 | 2.7238194E-01 | 6.0902873E-02 |
| 9 | -1.8081728E+03 | -3.8490478E-01 | -1.5434747E-01 | 8.1345356E-02 | 1.3560885E-01 |
| 10 | 2.2603251E+02 | -1.3130069E-01 | -2.5807345E-01 | 1.6147425E+00 | -5.4272442E+00 |
| 11 | -4.6623408E+00 | -1.6365793E-01 | 1.8278324E-02 | 5.9374433E-01 | -6.0736285E-01 |
| 12 | -1.9894736E+00 | -5.6719881E-01 | 7.4284723E-01 | -7.2618911E-01 | 2.5432263E-01 |
| 13 | -1.2553001E+01 | -2.9341391E-01 | 3.6179656E-01 | -3.1675505E-01 | 1.6971564E-01 |

| Surface Number | A12 | A14 | A16 |
|---|---|---|---|
| 1 | -3.4030500E-01 | — | — |
| 2 | 2.7483387E-01 | — | — |
| 4 | 4.1058708E-01 | — | — |

TABLE 4-continued

Example 2: Aspherical Surface Data

| | | | |
|---|---|---|---|
| 5 | 4.8736568E+00 | — | — |
| 6 | −7.8187424E−01 | — | — |
| 7 | −2.2643419E−01 | — | — |
| 8 | −1.3238089E+00 | — | — |
| 9 | −2.5558542E−01 | — | — |
| 10 | 9.0797962E+00 | −7.6982142E+00 | 2.0240113E+00 |
| 11 | −1.6928988E−01 | 3.6307309E−01 | −1.0332873E−01 |
| 12 | 5.8013592E−02 | 7.6966443E−02 | −8.0726493E−02 |
| 13 | −6.2294276E−02 | 1.4875286E−02 | −1.6529661E−03 |

TABLE 5

Example 3
$f = 2.56, Bf = 0.57, Fno. = 1.95, 2\omega = 82.4$

| Si | Ri | Di | Ndj | νdj |
|---|---|---|---|---|
| *1 | 1.1688 | 0.4439 | 1.544 | 55.9 |
| *2 | −91.5376 | 0.0602 | | |
| 3 (St) | ∞ | 0.0176 | | |
| *4 | 62.9138 | 0.1699 | 1.650 | 21.4 |
| *5 | 2.3286 | 0.1092 | | |
| *6 | 6.9674 | 0.4381 | 1.544 | 55.9 |
| *7 | −9.9991 | 0.0626 | | |
| *8 | −89.7489 | 0.1702 | 1.650 | 21.4 |
| *9 | −40.2345 | 0.2289 | | |
| *10 | 63.5600 | 0.4981 | 1.544 | 55.9 |
| *11 | −0.9547 | 0.1842 | | |
| *12 | −1.4740 | 0.2260 | 1.544 | 55.9 |
| *13 | 1.2454 | 0.2500 | | |
| *14 | ∞ | 0.2500 | 1.517 | 64.2 |
| *15 | ∞ | 0.1518 | | |
| 16 (IMG) | ∞ | | | |

*aspherical surface

TABLE 7

Example 4
$f = 2.58, Bf = 0.59, Fno. = 1.95, 2\omega = 82.2$

| Si | Ri | Di | Ndj | νdj |
|---|---|---|---|---|
| *1 | 1.1818 | 0.3480 | 1.544 | 55.9 |
| *2 | 98.0343 | 0.0602 | | |
| 3 (St) | ∞ | 0.0608 | | |
| *4 | 50.5110 | 0.1747 | 1.650 | 21.4 |
| *5 | 2.3991 | 0.1435 | | |
| *6 | 6.9719 | 0.4517 | 1.544 | 55.9 |
| *7 | −10.5191 | 0.0673 | | |
| *8 | 55.2724 | 0.1706 | 1.650 | 21.4 |
| *9 | −87.9191 | 0.2149 | | |
| *10 | 98.3353 | 0.4888 | 1.544 | 55.9 |
| *11 | −0.9324 | 0.1879 | | |
| *12 | −1.4418 | 0.2290 | 1.544 | 55.9 |
| *13 | 1.2381 | 0.2500 | | |
| *14 | ∞ | 0.2500 | 1.517 | 64.2 |
| *15 | ∞ | 0.1764 | | |
| 16 (IMG) | ∞ | | | |

*aspherical surface

TABLE 6

Example 3: Aspherical Surface Data

| Surface Number | KA | A4 | A6 | A8 | A10 |
|---|---|---|---|---|---|
| 1 | 3.9456621E−01 | 2.2760251E−02 | 6.0509472E−02 | −1.6426336E−01 | 2.3793564E−01 |
| 2 | 1.3704889E+04 | 5.7510184E−02 | −9.1024051E−02 | 1.5600458E−01 | −4.3526319E−01 |
| 4 | 9.3481575E+03 | 1.1245394E−01 | 1.0408097E−01 | −1.8268186E−01 | 1.4629164E−02 |
| 5 | −7.3939771E−01 | 1.1277813E−01 | 3.0737916E−01 | 3.1982921E−01 | −1.9916112E+00 |
| 6 | 1.1053273E+02 | −1.2566577E−01 | −1.8828168E−01 | 5.3801258E−01 | −6.5896349E−01 |
| 7 | 1.8231842E+02 | −2.2009076E−01 | −2.0478140E−01 | 1.0330486E−01 | −6.7783293E−01 |
| 8 | 6.0047105E+03 | −4.3126671E−01 | −3.5758377E−01 | 2.5857895E−01 | 9.2172966E−02 |
| 9 | −1.6406626E+03 | −3.8336147E−01 | −1.4282321E−01 | 1.0236929E−01 | 1.4764498E−01 |
| 10 | −7.4790179E+04 | −1.2979717E−01 | −2.5193445E−01 | 1.6243053E+00 | −5.4368180E+00 |
| 11 | −4.2971678E+00 | −1.6761197E−01 | 1.6526311E−02 | 5.9668008E−01 | −5.9889704E−01 |
| 12 | −1.8605342E+00 | −5.7011116E−01 | 7.4616023E−01 | −7.1061198E−01 | 2.6492660E−01 |
| 13 | −1.2464866E+01 | −2.9399831E−01 | 3.6549600E−01 | −3.1765136E−01 | 1.6962080E−01 |

| Surface Number | A12 | A14 | A16 |
|---|---|---|---|
| 1 | −3.4030500E−01 | — | — |
| 2 | 2.7561444E−01 | — | — |
| 4 | 1.2750180E−01 | — | — |
| 5 | 4.0378858E+00 | — | — |
| 6 | −1.4165638E+00 | — | — |
| 7 | −1.6136738E−01 | — | — |
| 8 | −1.2066690E+00 | — | — |
| 9 | −2.8883926E−01 | — | — |
| 10 | 9.0274339E+00 | −7.6693111E+00 | 2.0405483E+00 |
| 11 | −1.6292783E−01 | 3.6607872E−01 | −1.0777660E−01 |
| 12 | 5.9416033E−02 | 7.1243370E−02 | −8.3526686E−02 |
| 13 | −6.2173881E−02 | 1.4920982E−02 | −1.6748761E−03 |

TABLE 8

Example 4: Aspherical Surface Data

| Surface Number | KA | A4 | A6 | A8 | A10 |
|---|---|---|---|---|---|
| 1 | 4.3888403E−01 | 2.6379569E−02 | 6.0979830E−02 | −1.5410195E−01 | 2.7225848E−01 |
| 2 | −4.3306249E+04 | 5.5496179E−02 | −8.8806192E−02 | 1.8679677E−01 | −3.6880101E−01 |
| 4 | 3.5702809E+03 | 1.0702759E−01 | 9.2658044E−02 | −1.7866221E−01 | 4.7580326E−02 |
| 5 | 2.3149436E−01 | 1.1073321E−01 | 2.7080351E−01 | 1.9368353E−01 | −1.8562540E+00 |
| 6 | 1.1125335E+02 | −1.2975498E−01 | −2.2067940E−01 | 4.1681150E−01 | −6.7656556E−01 |
| 7 | 1.8899436E+02 | −2.2969899E−01 | −2.1742967E−01 | 1.0003602E−01 | −6.6756683E−01 |
| 8 | 4.7843143E+03 | −4.2856410E−01 | −3.4818677E−01 | 2.6518763E−01 | 7.4954774E−02 |
| 9 | −2.5348872E+03 | −3.8588068E−01 | −1.4544375E−01 | 8.2583863E−02 | 1.1991825E−01 |
| 10 | −2.1758965E+05 | −1.3079882E−01 | −2.6089557E−01 | 1.6180474E+00 | −5.4320361E+00 |
| 11 | −4.2643704E+00 | −1.6277204E−01 | 2.0559726E−02 | 5.9633918E−01 | −6.0047519E−01 |
| 12 | −1.6686129E+00 | −5.6765843E−01 | 7.5064032E−01 | −7.0852440E−01 | 2.5097469E−01 |
| 13 | −1.2702007E+01 | −2.9319915E−01 | 3.6435032E−01 | −3.1687894E−01 | 1.6974499E−01 |

| Surface Number | A12 | A14 | A16 |
|---|---|---|---|
| 1 | −3.4030500E−01 | — | — |
| 2 | 2.3517579E−01 | — | — |
| 4 | 4.2491190E−01 | — | — |
| 5 | 4.8748126E+00 | — | — |
| 6 | −5.3836411E−01 | — | — |
| 7 | −1.0556445E−01 | — | — |
| 8 | −1.2932578E+00 | — | — |
| 9 | −2.7344438E−01 | — | — |
| 10 | 9.0637358E+00 | −7.6905609E+00 | 2.0333774E+00 |
| 11 | −1.6672172E−01 | 3.6324345E−01 | −1.0480118E−01 |
| 12 | 5.4455113E−02 | 7.7241080E−02 | −8.0503610E−02 |
| 13 | −6.2352930E−02 | 1.4844654E−02 | −1.6331469E−03 |

TABLE 9

Example 5
f = 2.58, Bf = 0.62, Fno. = 1.95, 2ω = 84.4

| Si | Ri | Di | Ndj | νdj |
|---|---|---|---|---|
| *1 | 1.1765 | 0.3074 | 1.544 | 55.9 |
| *2 | 26.7079 | 0.0677 | | |
| 3 (St) | ∞ | 0.0725 | | |
| *4 | 98.6028 | 0.1703 | 1.650 | 21.4 |
| *5 | 2.4715 | 0.1212 | | |
| *6 | 6.2334 | 0.4998 | 1.544 | 55.9 |
| *7 | −9.8182 | 0.0939 | | |
| *8 | 42.4789 | 0.1701 | 1.650 | 21.4 |
| *9 | 82.5221 | 0.1849 | | |
| *10 | 77.7306 | 0.4606 | 1.544 | 55.9 |
| *11 | −0.9204 | 0.1943 | | |
| *12 | −1.5462 | 0.2361 | 1.544 | 55.9 |
| *13 | 1.1808 | 0.2500 | | |
| *14 | ∞ | 0.2500 | 1.517 | 64.2 |
| *15 | ∞ | 0.2004 | | |
| 16 (IMG) | ∞ | | | |

*aspherical surface

TABLE 10

Example 5: Aspherical Surface Data

| Surface Number | KA | A4 | A6 | A8 | A10 |
|---|---|---|---|---|---|
| 1 | 3.7242110E−01 | 1.4640986E−02 | 5.9300996E−02 | −2.5187072E−01 | 3.6177829E−01 |
| 2 | −5.2952037E+03 | 3.9323888E−02 | −1.0304791E−01 | 2.3234668E−01 | −3.3178812E−01 |
| 4 | 1.8350351E+04 | 1.4229148E−01 | 1.6565813E−01 | −2.2902569E−01 | −1.0521253E−01 |
| 5 | 3.3333336E+00 | 1.4503673E−01 | 3.6415707E−01 | 2.2370859E−01 | −2.2100181E+00 |
| 6 | 7.5399220E+01 | −1.2674120E−01 | −1.3939008E−01 | 5.2953548E−01 | −8.2375950E−01 |
| 7 | 1.6810447E+02 | −2.4654925E−01 | −2.0696580E−01 | 1.6851837E−01 | −6.2640501E−01 |
| 8 | 2.6957336E+03 | −4.2629012E−01 | −3.0658608E−01 | 2.8965749E−01 | 2.2115683E−02 |
| 9 | 6.2857739E+03 | −3.7807613E−01 | −1.4471208E−01 | 1.1059731E−01 | 1.3934657E−01 |
| 10 | −2.3138252E+05 | −1.4478526E−01 | −2.7036942E−01 | 1.5849683E+00 | −5.4621138E+00 |
| 11 | −4.2366085E+00 | −1.8044968E−01 | 5.3365827E−03 | 5.9169021E−01 | −5.9293000E−01 |
| 12 | −2.5873029E+00 | −5.6761133E−01 | 7.4176164E−01 | −7.1844951E−01 | 2.5738528E−01 |
| 13 | −1.1735410E+01 | −2.8586637E−01 | 3.6214723E−01 | −3.1745292E−01 | 1.6965181E−01 |

| Surface Number | A12 | A14 | A16 |
|---|---|---|---|
| 1 | −3.4030500E−01 | — | — |
| 2 | 1.5290457E−01 | — | — |

TABLE 10-continued

Example 5: Aspherical Surface Data

| | | | |
|---|---|---|---|
| 4 | 5.2009408E−01 | — | — |
| 5 | 4.3039687E+00 | — | — |
| 6 | −1.0404590E+00 | — | — |
| 7 | −4.6181512E−01 | — | — |
| 8 | −1.3626875E+00 | — | — |
| 9 | −3.2662906E−01 | — | — |
| 10 | 9.1851889E+00 | −7.5041860E+00 | 1.7532352E+00 |
| 11 | −1.7229556E−01 | 3.6189509E−01 | −1.0251526E−01 |
| 12 | 6.4023468E−02 | 7.1957771E−02 | −8.0768510E−02 |
| 13 | −6.2153231E−02 | 1.4870886E−02 | −1.6527253E−03 |

TABLE 11

Example 6
f = 2.56, Bf = 0.58, Fno. = 1.95, 2ω = 82.4

| Si | Ri | Di | Ndj | νdj |
|---|---|---|---|---|
| *1 | 1.1771 | 0.3596 | 1.544 | 55.9 |
| *2 | 98.0343 | 0.0600 | | |
| 3 (St) | ∞ | 0.0538 | | |
| *4 | 47.5033 | 0.1906 | 1.650 | 21.4 |
| *5 | 2.4202 | 0.1315 | | |
| *6 | 6.9260 | 0.4741 | 1.544 | 55.9 |
| *7 | −10.5056 | 0.0677 | | |
| *8 | −95.2724 | 0.1727 | 1.650 | 21.4 |
| *9 | −47.9191 | 0.1986 | | |

TABLE 11-continued

Example 6
f = 2.56, Bf = 0.58, Fno. = 1.95, 2ω = 82.4

| Si | Ri | Di | Ndj | νdj |
|---|---|---|---|---|
| *10 | 98.3353 | 0.4778 | 1.544 | 55.9 |
| *11 | −0.9304 | 0.1994 | | |
| *12 | −1.4548 | 0.2179 | 1.544 | 55.9 |
| *13 | 1.2366 | 0.2500 | | |
| *14 | ∞ | 0.2500 | 1.517 | 64.2 |
| *15 | ∞ | 0.1638 | | |
| 16 (IMG) | ∞ | | | |

*aspherical surface

TABLE 12

Example 6: Aspherical Surface Data

| Surface Number | KA | A4 | A6 | A8 | A10 |
|---|---|---|---|---|---|
| 1 | 4.2076570E−01 | 2.6281365E−02 | 6.1121051E−02 | −1.5358872E−01 | 2.7243154E−01 |
| 2 | −4.9950694E+04 | 5.5595904E−02 | −8.9145166E−02 | 1.8617757E−01 | −3.6908050E−01 |
| 4 | 3.4508510E+03 | 1.0687129E−01 | 9.2223497E−02 | −1.7986487E−01 | 4.4971386E−02 |
| 5 | 2.8726906E−01 | 1.1093841E−01 | 2.7052165E−01 | 1.9346095E−01 | −1.8564388E+00 |
| 6 | 1.1126853E+02 | −1.2979162E−01 | −2.2013747E−01 | 4.1905457E−01 | −6.6840366E−01 |
| 7 | 1.8904924E+02 | −2.2972610E−01 | −2.1764278E−01 | 1.0016369E−01 | −6.6727335E−01 |
| 8 | 4.5925627E+03 | −4.2864456E−01 | −3.4799313E−01 | 2.6490316E−01 | 7.3999672E−02 |
| 9 | −2.7628508E+03 | −3.8580736E−01 | −1.4543055E−01 | 8.2790840E−02 | 1.2033010E−01 |
| 10 | −1.7230849E+05 | −1.3095266E−01 | −2.6064343E−01 | 1.6189501E+00 | −5.4307440E+00 |
| 11 | −4.1306570E+00 | −1.6269217E−01 | 2.0474092E−02 | 5.9619007E−01 | −6.0050001E−01 |
| 12 | −1.6941136E+00 | −5.6759533E−01 | 7.5073136E−01 | −7.0859794E−01 | 2.5086129E−01 |
| 13 | −1.2871796E+01 | −2.9326590E−01 | 3.6435729E−01 | −3.1687930E−01 | 1.6974334E−01 |

| Surface Number | A12 | A14 | A16 |
|---|---|---|---|
| 1 | −3.4030500E−01 | — | — |
| 2 | 2.3582241E−01 | — | — |
| 4 | 4.1784859E−01 | — | — |
| 5 | 4.8815814E+00 | — | — |
| 6 | −5.1648927E−01 | — | — |
| 7 | −1.0563843E−01 | — | — |
| 8 | −1.2948185E+00 | — | — |
| 9 | −2.7301405E−01 | — | — |
| 10 | 9.0639357E+00 | −7.6925429E+00 | 2.0327230E+00 |
| 11 | −1.6672679E−01 | 3.6323378E−01 | −1.0480502E−01 |
| 12 | 5.4305135E−02 | 7.7119126E−02 | −8.0541110E−02 |
| 13 | −6.2354568E−02 | 1.4843511E−02 | −1.6336353E−03 |

TABLE 13

Values Related to Conditional Formulae

| Formula | Condition | Example 1 | Example 2 | Example 3 | Example 4 | Example 5 | Example 6 |
|---|---|---|---|---|---|---|---|
| 1 | f23/f | −3.26 | −3.26 | −3.02 | −3.21 | −3.65 | −3.33 |
| 2 | f34/f | 2.82 | 2.96 | 2.79 | 2.64 | 2.61 | 2.88 |

TABLE 13-continued

Values Related to Conditional Formulae

| Formula | Condition | Example 1 | Example 2 | Example 3 | Example 4 | Example 5 | Example 6 |
|---|---|---|---|---|---|---|---|
| 3 | f56/f | −3.89 | −3.80 | −3.11 | −3.21 | −3.89 | −3.50 |
| 4 | f2/f | −1.54 | −1.53 | −1.45 | −1.50 | −1.51 | −1.53 |
| 5 | f3/f | 3.09 | 3.07 | 2.97 | 3.01 | 2.75 | 3.02 |
| 6 | f4/f | 30.47 | 87.29 | 43.71 | 20.24 | 52.13 | 57.76 |
| 7 | f3/f2 | −2.01 | −2.00 | −2.05 | −2.00 | −1.82 | −1.97 |
| 8 | f1/f5 | 1.27 | 1.25 | 1.23 | 1.29 | 1.34 | 1.29 |
| 9 | CT3/CT4 | 2.80 | 2.49 | 2.57 | 2.65 | 2.94 | 2.75 |
| 10 | CT5/CT6 | 2.76 | 2.32 | 2.20 | 2.13 | 1.95 | 2.19 |
| 11 | (L3r − L3f)/(L3r + L3f) | 5.09 | 4.79 | 5.60 | 4.93 | 4.48 | 4.87 |
| 12 | (L6r − L6f)/(L6r + L6f) | −14.14 | −11.49 | −11.90 | −13.16 | −7.46 | −12.33 |
| 13 | f · tanω/L6r | 1.78 | 1.82 | 1.80 | 1.82 | 1.98 | 1.82 |

Note that the above paraxial radii of curvature, the distances among surfaces, the refractive indices, and the Abbe's numbers were obtained by measurements performed by specialists in the field of optical measurement, according to the methods described below.

The paraxial radii of curvature were obtained by measuring the lenses using an ultra high precision three dimensional measurement device UA3P (by Panasonic Factory Solutions K. K.) by the following procedures. A paraxial radius of curvature $R_m$ (m is a natural number) and a conical coefficient $K_m$ are preliminarily set and input into UA3P, and an nth order aspherical surface coefficient An of an aspherical shape formula is calculated from the input paraxial radius of curvature $R_m$ and conical coefficient $K_m$ and the measured data, using a fitting function of UA3P. $C=1/R_m$ and $KA=K_m-1$ are considered in the aforementioned aspherical surface shape formula (A). Depths Z of an aspherical surface in the direction of the optical axis corresponding to heights h from the optical axis are calculated from $R_m$, $K_m$, An, and the aspherical surface shape formula. The difference between the calculated depths Z and actually measured depth values Z' are obtained for each height h from the optical axis. Whether the difference is within a predetermined range is judged. In the case that the difference is within the predetermined range, $R_m$ is designated as the paraxial radius of curvature. On the other hand, in the case that the difference is outside the predetermined range, the value of at least one of $R_m$ and $K_m$ is changed, set as $R_{m+1}$ and $K_{m+1}$, and input to UA3P. The processes described above are performed, and judgment regarding whether the difference between the calculated depths Z and actually measured depth values Z' for each height h from the optical axis is within a predetermined range is judged. These procedures are repeated until the difference between the calculated depths Z and actually measured depth values Z' for each height h from the optical axis is within a predetermined range. Note that here, the predetermined range is set to be 200 nm or less. In addition, a range from 0 to ⅕ the maximum lens outer diameter is set as the range of h.

The distances among surfaces are obtained by measurements using OptiSurf (by Trioptics), which is an apparatus for measuring the central thicknesses and distances between surfaces of paired lenses.

The refractive indices are obtained by performing measurements in a state in which the temperature of a measurement target is 25° C., using KPR-2000 (by K. K. Shimadzu), which is a precision refractometer. The refractive index measured with respect to the d line (wavelength: 587.6 nm) is designated as Nd. Similarly, the refractive index measured with respect to the e line (wavelength: 546.1 nm) is designated as Ne, the refractive index measured with respect to the F line (wavelength: 486.1 nm) is designated as NF, the refractive index measured with respect to the C line (wavelength: 656.3 nm) is designated as NC, and the refractive index measured with respect to the g line (wavelength: 435.8 nm) is designated as Ng. The Abbe's number vd with respect to the d line is obtained by calculations, substituting the values of Nd, NF, and NC obtained by the above measurements into the formula below.

$$vd=(Nd-1)/(NF-NC)$$

What is claimed is:
1. An imaging lens consisting of six lenses, including:
   a first lens having a positive refractive power and a convex surface toward the object side;
   a second lens having a negative refractive power and a convex surface toward the object side;
   a third lens having a positive refractive power;
   a fourth lens having a positive refractive power;
   a fifth lens having a positive refractive power and a convex surface toward the object side; and
   a sixth lens having a negative refractive power, provided in this order from the object side;
   the imaging lens satisfying the following conditional formulae:

$$f23/f<-2.5 \qquad (1);$$

$$2<f34/f<4.5 \qquad (2)$$

wherein f23 is the combined focal length of the second lens and the third lens, f34 is the combined focal length of the third lens and the fourth lens, and f is the focal length of the entire system.
2. An imaging lens as defined in claim 1, wherein:
   the third lens has a convex surface toward the image side.
3. An imaging lens as defined in any claim 1 that further satisfies the conditional formula below:

$$-7.8<f56/f<-1.2 \qquad (3)$$

wherein f56 is the combined focal length of the fifth lens and theسسxth lens, and f is the focal length of the entire system.
4. An imaging lens as defined in claim 1 that further satisfies the conditional formula below:

$$-1.75<f2/f<-1.3 \qquad (4)$$

wherein f2 is the focal length of the second lens, and f is the focal length of the entire system.

5. An imaging lens as defined in claim 1 that further satisfies the conditional formula below:

$$15 < f4/f < 120 \tag{6}$$

wherein f4 is the focal length of the fourth lens, and f is the focal length of the entire system.

6. An imaging lens as defined in claim 1 that further satisfies the conditional formula below:

$$-5 < f3/f2 < -1 \tag{7}$$

wherein f3 is the focal length of the third lens, and f2 is the focal length of the second lens.

7. An imaging lens as defined in claim 1 that further satisfies the conditional formula below:

$$1 < CT3/CT4 < 6 \tag{9}$$

wherein CT3 is the thickness of the third lens along the optical axis, and CT4 is the thickness of the fourth lens along the optical axis.

8. An imaging lens as defined in claim 1 that further satisfies the conditional formula below:

$$1.7 < CT5/CT6 < 5 \tag{10}$$

wherein CT5 is the thickness of the fifth lens along the optical axis, and CT6 is the thickness of the sixth lens along the optical axis.

9. An imaging lens as defined in claim 1 that further satisfies the conditional formula below:

$$2.3 < (L3r - L3f)/(L3r + L3f) < 8.5 \tag{11}$$

wherein L3r is the paraxial radius of curvature of the surface of the third lens toward the image side, and L3f is the paraxial radius of curvature of the surface of the third lens toward the object side.

10. An imaging lens as defined in claim 1 that further satisfies the conditional formula below:

$$-20 < (L6r - L6f)/(L6r + L6f) < -3.5 \tag{12}$$

wherein L6r is the paraxial radius of curvature of the surface of the sixth lens toward the image side, and L6f is the paraxial radius of curvature of the surface of the sixth lens toward the object side.

11. An imaging lens as defined in claim 1, further comprising:
an aperture stop positioned at the object side of the surface of the second lens toward the object side.

12. An imaging lens as defined in claim 1 that further satisfies the conditional formula below:

$$0.5 < f \cdot \tan \omega / L6r < 20 \tag{13}$$

wherein f is the focal length of the entire system, ω is half the maximum angle of view when focused on an object at infinity, and L6r is the paraxial radius of curvature of the surface of the sixth lens toward the image side.

13. An imaging lens as defined in claim 1 that further satisfies the conditional formula below:

$$f23/f < -2.8 \tag{1-1}$$

wherein f23 is the combined focal length of the second lens and the third lens, and f is the focal length of the entire system.

14. An imaging lens as defined in claim 1 that further satisfies the conditional formula below:

$$2.2 < f34/f < 4.2 \tag{2-1}$$

wherein f34 is the combined focal length of the third lens and the fourth lens, and f is the focal length of the entire system.

15. An imaging lens as defined in claim 1 that further satisfies the conditional formula below:

$$-6.8 < f56/f < -2.2 \tag{3-1}$$

wherein f56 is the combined focal length of the fifth lens and the sixth lens, and f is the focal length of the entire system.

16. An imaging apparatus equipped with an imaging lens as defined in claim 1.

17. An imaging lens consisting of six lenses, including:
a first lens having a positive refractive power and a convex surface toward the object side;
a second lens having a negative refractive power and a convex surface toward the object side;
a third lens having a positive refractive power;
a fourth lens having a positive refractive power;
a fifth lens having a positive refractive power and a convex surface toward the object side; and
a sixth lens having a negative refractive power, provided in this order from the object side;
the imaging lens satisfying the following conditional formulae:

$$f23/f < -2.5 \tag{1};$$

$$2 < f3/f < 9 \tag{5}$$

wherein f23 is the combined focal length of the second lens and the third lens, f3 is the focal length of the third lens, and f is the focal length of the entire system.

18. An imaging lens consisting of six lenses, including:
a first lens having a positive refractive power and a convex surface toward the object side;
a second lens having a negative refractive power and a convex surface toward the object side;
a third lens having a positive refractive power;
a fourth lens having a positive refractive power;
a fifth lens having a positive refractive power and a convex surface toward the object side; and
a sixth lens having a negative refractive power, provided in this order from the object side;
the imaging lens satisfying the following conditional formulae:

$$f23/f < -2.5 \tag{1};$$

$$1.15 < f1/f5 < 3 \tag{8}$$

wherein f23 is the combined focal length of the second lens and the third lens, f is the focal length of the entire system, f1 is the focal length of the first lens, and f5 is the focal length of the fifth lens.

* * * * *